(12) United States Patent
Winnemoeller et al.

(10) Patent No.: US 10,521,889 B2
(45) Date of Patent: *Dec. 31, 2019

(54) ENHANCED VECTORIZATION OF RASTER IMAGES

(71) Applicant: Adobe Inc., San Jose, CA (US)

(72) Inventors: Holger Winnemoeller, Seattle, WA (US); Wilmot Wei-Mau Li, Seattle, WA (US); Stephen N. Schiller, Oakland, CA (US); Jun Xie, Seattle, WA (US)

(73) Assignee: Adobe Inc., San Jose, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 15/952,027

(22) Filed: Apr. 12, 2018

(65) Prior Publication Data

US 2018/0232863 A1 Aug. 16, 2018

Related U.S. Application Data

(63) Continuation of application No. 15/189,891, filed on Jun. 22, 2016, now Pat. No. 9,972,073.

(51) Int. Cl.
*G06K 9/00* (2006.01)
*G06T 5/00* (2006.01)
(Continued)

(52) U.S. Cl.
CPC ............. *G06T 5/003* (2013.01); *G06K 9/481* (2013.01); *G06T 5/002* (2013.01); *G06T 7/13* (2017.01); *G06T 7/33* (2017.01)

(58) Field of Classification Search
CPC .................................................... G06T 5/003
See application file for complete search history.

(56) References Cited

U.S. PATENT DOCUMENTS 8,391,618 B1 3/2013 Chuang et al.
9,972,073 B2 5/2018 Winnemoeller et al.
(Continued)

OTHER PUBLICATIONS

Tilly (NPL: "Semantic User Interface" 1Oracle Corp., H-1123 Budapest, Alkotás u. 17-19, Hungary, 2007.) (Year 2007).*
(Continued)

*Primary Examiner* — Oneal R Mistry
(74) *Attorney, Agent, or Firm* — SBMC

(57) ABSTRACT

Enhanced vectorization of raster images is described. An image vectorization module converts a raster image with bitmapped data to a vector image with vector elements based on mathematical formulas. In some embodiments, spatially-localized control of a vectorization operation is provided to a user. First, the user can adjust an intensity of a denoising operation differently at different areas of the raster image. Second, the user can adjust an automated segmentation by causing one segment to be split into two segments along a zone marked with an indicator tool, such as a brush. Third, the user can adjust an automated segmentation by causing two segments to be merged into a combined segment. The computation of the vector elements is based on the adjusted segmentation. In other embodiments, semantic information gleaned from the raster image is incorporated into the vector image to facilitate manipulation, such as joint selection of multiple vector elements.

20 Claims, 18 Drawing Sheets

(51) Int. Cl.
*G06K 9/48* (2006.01)
*G06T 7/13* (2017.01)
*G06T 7/33* (2017.01)

(56) References Cited

U.S. PATENT DOCUMENTS

| | | |
|---|---|---|
| 2003/0113017 A1* | 6/2003 | Thomas ............... G06K 9/342 382/181 |
| 2010/0040285 A1* | 2/2010 | Csurka ............... G06K 9/00624 382/170 |
| 2010/0067824 A1* | 3/2010 | Sunkavalli ............... G06T 7/11 382/274 |
| 2011/0099137 A1 | 4/2011 | Schein et al. |
| 2012/0314935 A1 | 12/2012 | Cheng et al. |
| 2013/0201206 A1 | 8/2013 | Bryant et al. |
| 2016/0012276 A1 | 1/2016 | Malitz et al. |
| 2016/0162751 A1 | 6/2016 | You et al. |
| 2017/0372455 A1 | 12/2017 | Winnemoeller et al. |

OTHER PUBLICATIONS

"First Action Interview Office Action", U.S. Appl. No. 15/189,891, dated Oct. 25, 2017, 3 pages.

"Notice of Allowance", U.S. Appl. No. 15/189,891, dated Jan. 12, 2018, 8 pages.

"Pre-Interview Communication", U.S. Appl. No. 15/189,891, dated Aug. 17, 2017, 11 pages.

Arbelaez,"Contour Detection and Hierarchical Image Segmentation", Retrieved from <http://www.cs.berkeley.edu/~arbelaez/publications/amfm_pami2011.pdf> on Nov. 28, 2012, 2011, 20 pages.

Dollar,"Structured Forests for Fast Edge Detection", Dec. 1, 2013, 8 pages.

Liu,"Paint Selection", ACM Transactions on Graphics, vol. 28 Issue 3, Article No. 69, Jul. 2009, 7 pages.

Rother,""GrabCut"—Interactive Foreground Extraction using Iterated Graph Cuts", ACM SIGGRAPH 2004, Aug. 2004, 6 pages.

* cited by examiner

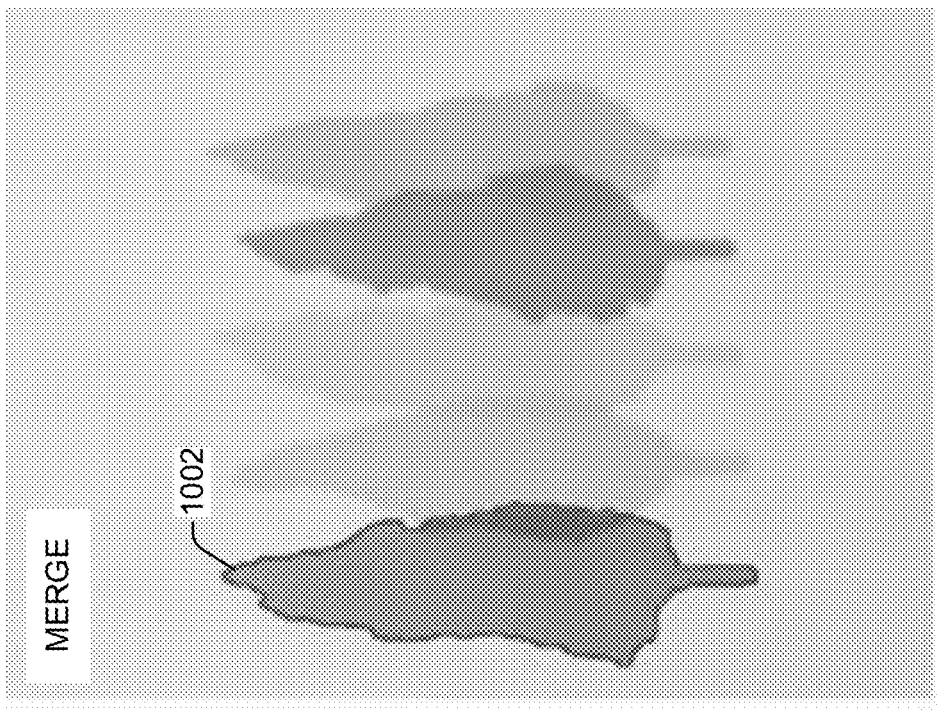
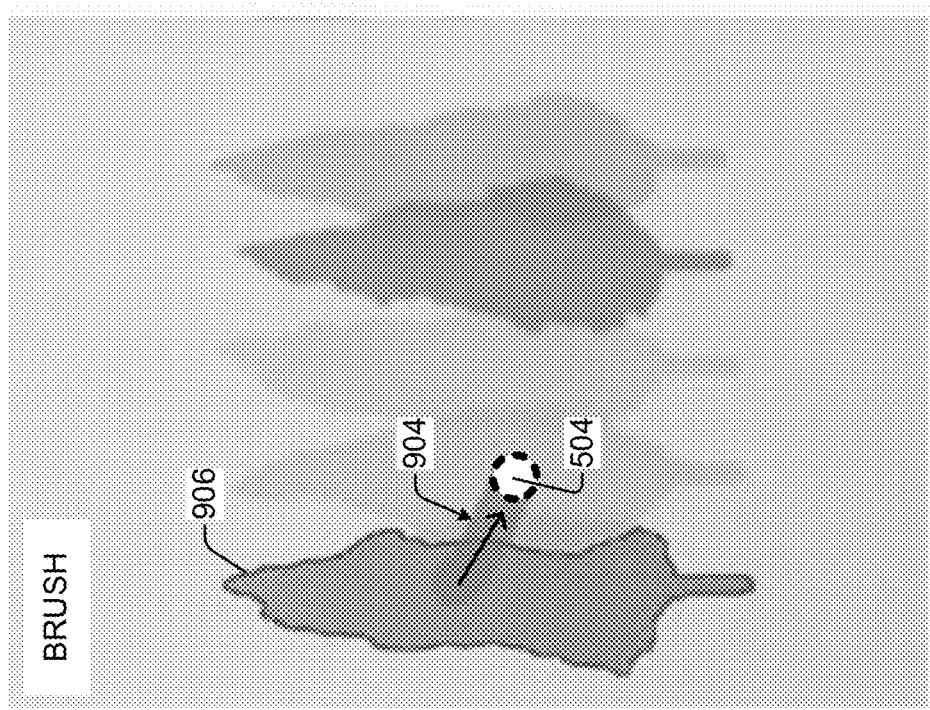
FIG. 10

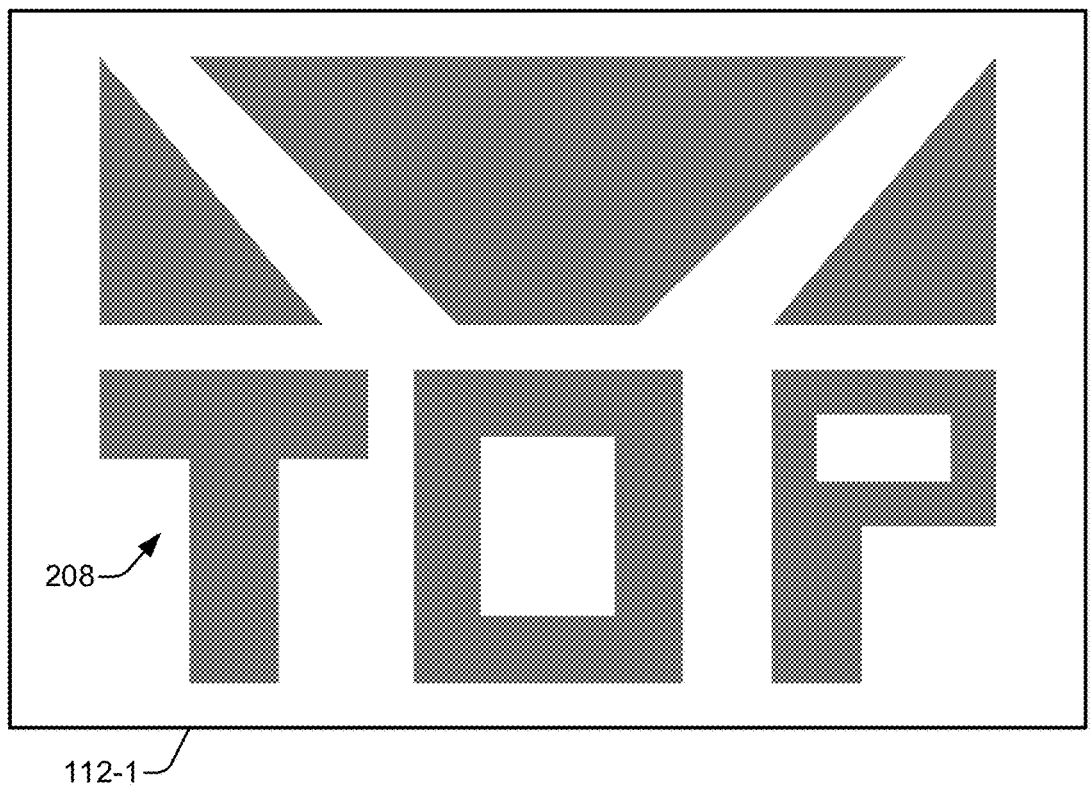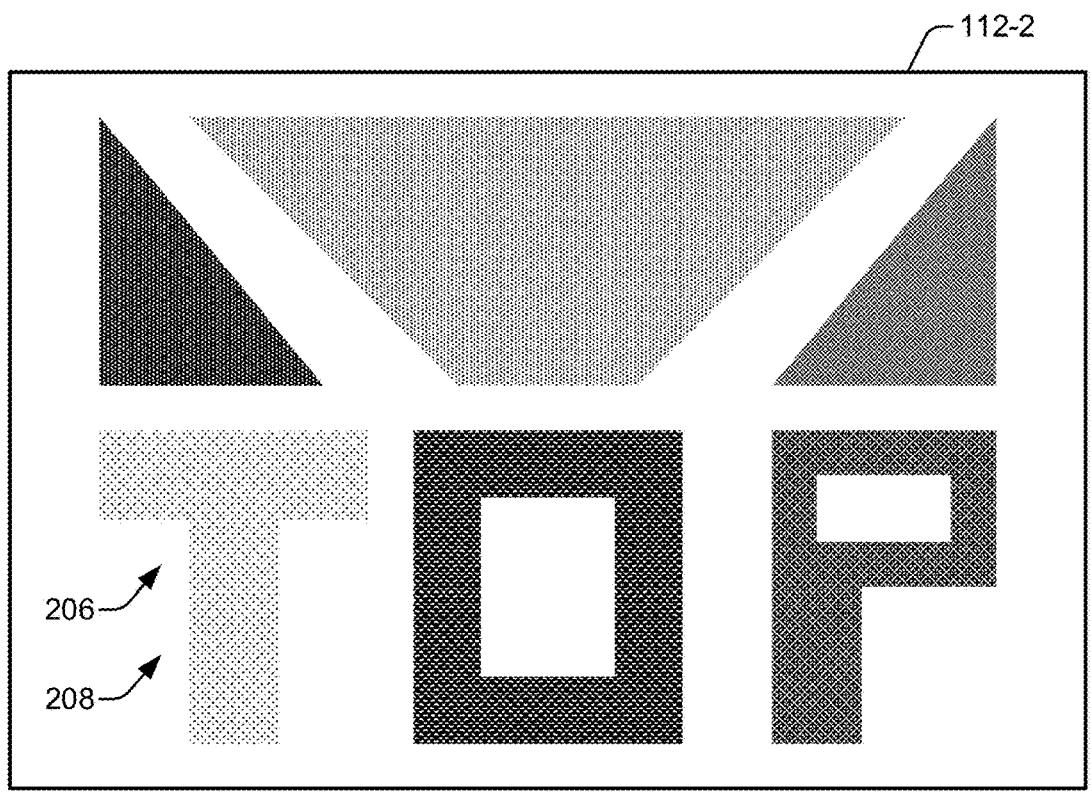
FIG. 14

ENHANCED VECTORIZATION OF RASTER IMAGES

RELATED APPLICATIONS

This application is a continuation of and claims priority to U.S. patent application Ser. No. 15/189,891, filed Jun. 22, 2016, entitled "Enhanced Vectorization of Raster Images", the disclosure of which is contained herein in its entirety by reference.

BACKGROUND

People use pictures to memorialize special memories and convey information visually. An image, such as a painter's canvas or an electronic file, provides a physical or technological foundation for a picture. A picture, on the other hand, represents the visual concept that is discernable to the human eye or mind Thus, images of pictures can be hand-drawn, produced using photography, computer-generated, displayed on a screen, and so forth. Such images are often shared, stored, or manipulated using electronic technology, such as a smart phone or desktop computer. This electronic technology is capable of processing images in many different forms. Two example prominent forms for electronic images are raster images and vector images, each of which has some relative advantages and disadvantages.

For raster images, information is electronically stored on a pixel-by-pixel basis, such as with bitmapped images. The picture of a raster image is divided into a grid of pixels having a known location, and the color of each pixel is stored. A raster image typically has a corresponding native resolution with a fixed width and a height in terms of pixel counts. If an electronic device zooms into the pixels of a raster image, the device can display a zoomed-in image of individual pixels that can be seen by the human eye, which is called pixelation.

For vector images, information is electronically stored for any given vector image based on mathematical formulas, such as lines, curves, and geometric shapes, which can also be filled with color. For example, visually-apparent features of a picture, such as a face or a letter, are represented by different mathematical formulas in a vector image. The mathematical formulas can be manipulated to change the appearance of a vector image. Because a mathematical description has a theoretically infinite resolution, vector images respond well to zooming and resizing.

Typically, many pictures originate as raster images. In many instances, pictures are initially produced in an electronic format using bit-mapped technology, such that the resulting images originate in a raster form. For example, cameras are now ubiquitous due to the proliferation of mobile phones, and cameras produce raster images. Additionally, because some people are more comfortable creating with physical materials or analog tools, art and graphic design projects are often drawn by hand instead of using computer-generated shapes. These hand-drawn images are then electronically scanned as raster images.

However, a vector form of a picture holds certain advantages over a corresponding raster form of the picture. For example, a file size of a vector image can be smaller than that of a corresponding raster image for some pictures, such as those based on design graphics. In other words, vector images are more storage efficient for certain types of pictures. Another advantage of vector images is that vector images are more easily manipulated, and often with better results. For instance, the ability to flexibly resize vector images is greater than that of raster images due to the explicit geometric descriptions of vector images.

For example, if a raster image is up-sampled in an attempt to increase its size, the resulting image becomes grainy as the individual pixels become visible (e.g., due to pixelation). The jagged effects of pixelation can be partially remedied by smoothing (e.g., applying anti-aliasing algorithms), but such smoothing usually results in a blurring of the features of the raster image. Further, if a raster image is down-sampled in an attempt to decrease its size, the resulting image becomes distorted. In contrast, resizing a vector image produces relatively superior results. Being based on mathematical constructs, vector images can be scaled to practically any resolution by redrawing the image at the new size using the mathematical formulas. After either upward or downward scaling, a vector image usually still looks smooth and undistorted.

Consequently, to benefit from the advantages of the vector form, pictures that originate as raster images are often vectorized to produce corresponding vector images. Unfortunately, existing approaches to vectorization produce vector images with a number of different problems. First, noise in an original raster image interferes with vectorization and can cause a cluttered, visually-unsatisfactory vector image to be produced. Second, lines and geometric shapes of the converted vector image may not accurately reflect the visually-apparent features of the original raster image. Third, a vectorization process may fail to properly fill or shade the vector shapes generated for the vector image. Thus, for conversions of raster images to vector images made in accordance with conventional vectorization approaches, these problems collectively cause such conversions to fail to reflect the visually-apparent features of the original picture in manners or to an extent that is desired by the person performing the conversion.

SUMMARY

Enhanced vectorization of raster images is described. Techniques and systems described herein enable localized user control of a vectorization operation, which is performed by an image vectorization module. The image vectorization module converts a raster image having a picture to a corresponding vector image having a version of the same picture. The picture in the raster image includes semantic elements discernable by a user. Examples of semantic elements from the perspective of the user include a background versus a foreground, a person, a car, a yellow table, an arm versus a face, among others. The image vectorization module detects edges in the raster image to create a contour map having multiple edges. The image vectorization module also recognizes image features, such as colors and textures and some objects, in the raster image to thereby implicitly identify semantic elements from the perspective of the application. Thus, image features of the raster image can serve as a proxy for the semantic elements of the picture.

Based on the image features and the contour map, the image vectorization module segments the raster image into multiple segments. The segments are organized or linked into a hierarchical segmentation tree in which at least some of the segments correspond to different semantic elements that are discernable by a user. The hierarchical segmentation tree enables the raster image to be analyzed at different levels of detail. For example, a high level of detail may include a background segment and a foreground segment. At a lower level of detail, the foreground segment may include a person segment, a car segment, and a bicycle segment.

The image vectorization module presents user interface features to provide localized control of a vectorization of the picture. The localized control pertains to a portion of the raster image, such as a particular area of a displayed image or a particular segment of the hierarchical segmentation tree. In operation, a device detects a user control signal, which may be detected via a mouse or touch screen. The user control signal indicates the portion of the raster image for which a localized vectorization characteristic is to be adjusted. The image vectorization module produces the vector image that corresponds to at least part of the picture based on the multiple segments and the adjusted localized vectorization characteristic. The adjusted localized vectorization characteristic enables different portions of the raster image to be vectorized using a differently-valued vectorization characteristic as compared to other portions or a global setting. The image vectorization module includes a denoising module, a segment splitting module, or a segment merging module to implement one or more locally-adjusted vectorization techniques.

In one example technique, the localized vectorization characteristic is adjusted by changing a level of intensity for a denoising operation. An image may include unsightly and distracting noise, such as splotchy dots or discolorations or distortion from visually-apparent graininess. The locally-adjusted vectorization technique involves a denoising module configured to remove noise from a raster image prior to edge detection so that the segmentation can focus on the semantic elements of the picture as represented by the image features of the raster image. In an example implementation, a user marks an area of a displayed raster image with an indicator tool. In response, the denoising module increases or decreases an intensity of a denoising operation in the vicinity of the indicated area to remove more noise or less noise, respectively, from the indicated area as compared to other areas of the raster image.

In another example technique, the localized vectorization characteristic is adjusted by accessing a different level of detail, such as a higher level, in a hierarchical segmentation tree. For example, a higher level of detail can be accessed so that at least one segment can be split responsive to user input to produce two segments that are better aligned with one or more semantic elements that are intended or desired by a user for a current task. In operation, segments are overlaid on a displayed raster image. The locally-adjusted vectorization technique involves a segment splitting module configured to detect a zone of a segment marked by a user using an indicator tool (e.g., a brush tool). Based on the indicated zone, the segment splitting module splits the marked segment into two segments. Thereafter, the two separate segments can be individually selected or deselected for other operations, including a vectorization of a picture of a raster image.

In yet another example technique, the localized vectorization characteristic is adjusted by accessing a different level of detail, such as a lower level, in a hierarchical segmentation tree. For example, a lower level of detail can be accessed so that two or more segments can be merged responsive to user input into a combined segment to better match at least one semantic element that is intended or desired by a user for a current purpose. In operation, segments are overlaid on a displayed raster image. The locally-adjusted vectorization technique involves a segment merging module configured to detect two segments indicated by a user with an indicator tool, such as if a user brushes across two different segments. Based on the indicated segments, the segment merging module merges the two segments into a combined segment. Thereafter, the combined segment can be selected or deselected as an atomic unit for other operations, including a vectorization of a picture of a raster image.

In other example implementations, the image vectorization module includes a semantic information incorporation module that analyzes the raster image to identify the semantic elements of the picture. Image features of the raster image serve as a proxy for the semantic elements of the picture. Thus, the semantic information incorporation module can effectively identify a semantic element of the picture by recognizing image features of the raster image. Recognizable image features include pixels that have the same color, pixels that contribute to the same texture, pixels that are within a same contour that is bounded by a detected edge, or a combination thereof. A vector image production module of the image vectorization module determines vector elements representative of at least part of a vector version of the picture. Each vector element can include a mathematical formula for a geometric shape or a colorization (e.g., a solid color, a monochromatic or polychromatic pattern, a texture, or a gradient) that is related thereto. Semantic metadata is generated based on the recognized image features. To enable the semantic information to survive the vectorization, the semantic information incorporation module incorporates the semantic metadata into the vector image. More specifically, the semantic information incorporation module can individually or jointly associate the vector elements with the semantic metadata. For example, vector elements that correspond to a same image feature are grouped together. The image vectorization module produces the vector image by bundling together the vector elements and the associated semantic metadata.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures.

FIGS. 9 and 10 illustrate a visual example of localized user control for a segment merging procedure.

FIGS. 13 and 14 illustrate a visual example of incorporating semantic information from a raster image into a vector image.

DETAILED DESCRIPTION

Overview

Figure 1:
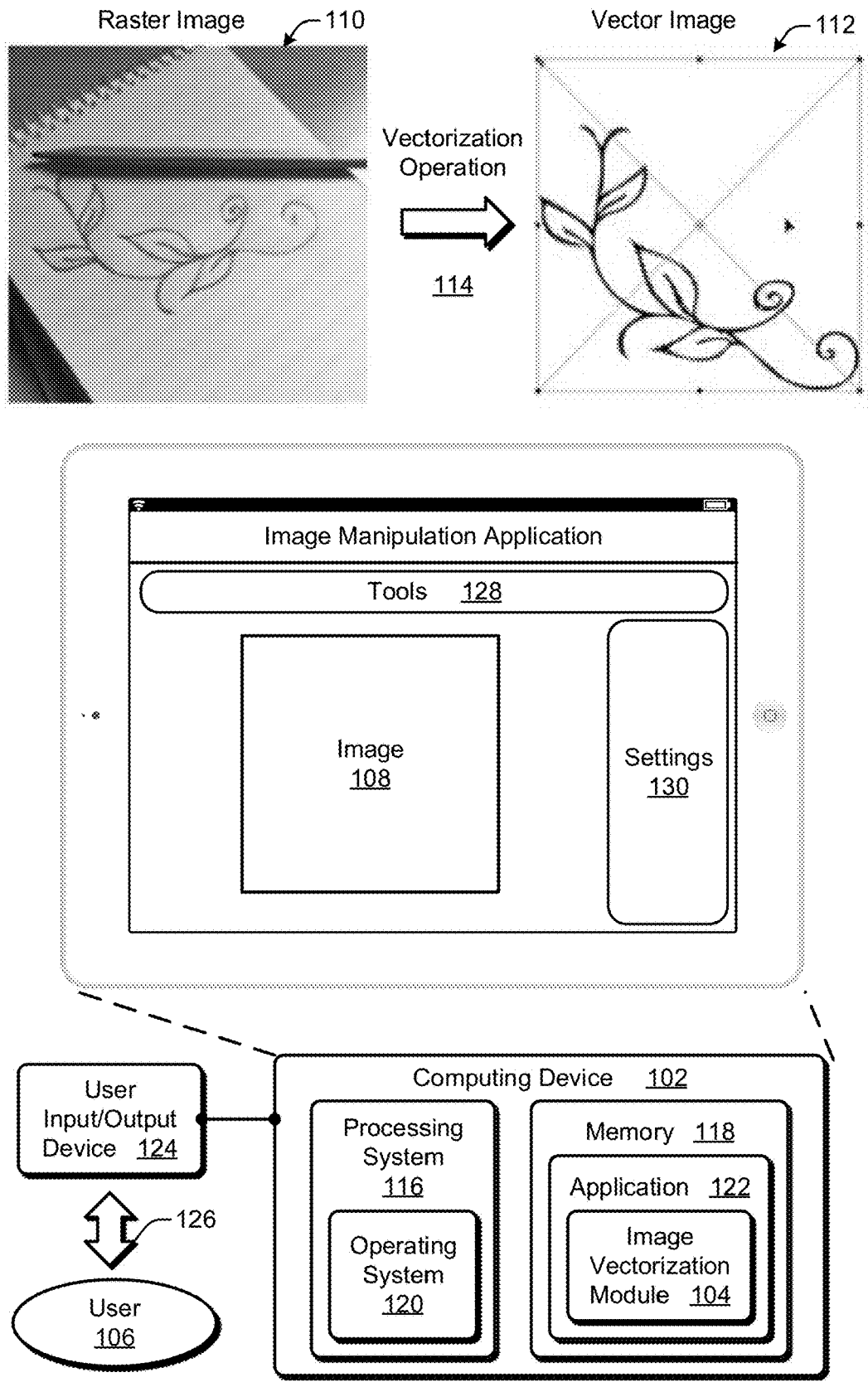
FIG. 1 illustrates an environment for example embodiments that are operable to implement enhanced vectorization of raster images.

Files having pictures can be stored or manipulated in a number of different forms. Example forms of picture files include raster images and vector images. Raster images have bitmapped data that describe a picture on a pixel-by-pixel basis. Vector images, in contrast, are mathematical constructs that describe a picture based on mathematical formulas, such as lines and geometric shapes. Many pictures, such as those taken with a camera of a smart phone, are initially obtained as raster images. However, vector images have some benefits over raster images. For example, file sizes for vector images can be smaller than those for corresponding raster images. Moreover, vector images can be resized at finer gradations and often with smoother results having little, if any, visibly-apparent degradation of the picture as a result of the resizing.

Thus, artists, graphic designers, and other people that work with images will sometimes wish to convert a raster image to a vector image using a process called vectorization. Vectorization of an image is a fairly complicated process that involves making many determinations to analyze the raster image and extract visually-apparent features and other image attributes that are used to build the mathematical formulas for the vector image. These determinations are made based on a multitude of parameters, such as a level of noise rejection, a default threshold for edge detection, or a preset level of image segmentation.

Conventional approaches to vectorization may provide a user with just one or two options for impacting some of these parameters or with an overwhelming number of options with unpredictable results. Even if a user control option for a given parameter is provided, conventional approaches limit a user's control of a vectorization process to a global level. In other words, if a user is actually empowered to adjust a vectorization parameter, the adjustment applies uniformly across the entirety of the raster image. Unfortunately, this coarse adjustment typically fails to produce satisfactory results for a whole picture across the raster image being vectorized. Different portions of a picture of a raster image may have different visually-apparent features that are affected in different ways by an adjusted parameter—with some portions positively affected and some portions negatively affected. Consequently, globally adjusting a vectorization parameter to improve a vectorization result in one area of a picture may adversely impact the vectorization results in other areas of the picture. Furthermore, achieving a desired final result can be difficult because each adjustment iteration not only impacts the entirety of the raster image unpredictably, but each iteration also takes a long time to reveal the results of the parameter adjustment.

To address such drawbacks of conventional vectorization approaches, techniques and systems described herein provide spatially-localized control of a vectorization operation responsive to user input. An image vectorization module performs a vectorization operation responsive to user control. With a vectorization operation, the image vectorization module converts a raster image having a picture to a corresponding vector image having a version of the same picture. In example embodiments, an edge detection module of the image vectorization module detects edges of the picture in the raster image as part of the vectorization operation, and at least some of these edges are transformed into mathematical formulas for the vector image.

The image vectorization module performs a vectorization operation based on user input that can locally control one or more parameters affecting the vectorization operation. The image vectorization module presents a user interface having one or more features enabling the module to receive user input indicative of how and where a user wishes to adjust a localized vectorization parameter. For example, prior to the edge detection, the image vectorization module can receive user input (e.g., via a user interface brush tool) indicative of an area of the raster image in which an intensity level of a denoising operation is to be decreased or increased relative to a default or global intensity level. Additionally, prior to the computation of the mathematical formulas for the vector elements, the image vectorization module can receive user input indicative of where an additional edge, or portion thereof, should be included in the results of the vectorization operation as part of a segment splitting procedure. Also prior to the computation of the mathematical formulas, the image vectorization module can receive user input indicative of where an existing edge, or portion thereof, should be excluded from the results of the vectorization operation as part of a segment merging procedure. With these spatially-localized control capabilities, the user is empowered to fine tune the vectorization operation by adjusting how the vectorization is performed at one or more local portions of the picture of the raster image while other portions can be unaffected.

In an example vectorization scenario, the picture in the raster image includes semantic elements discernable by a user. Examples of semantic elements from the perspective of the user include a background element versus a foreground element, a grouping of plants, a bus, a brown building, a head versus a body, a light element versus a dark element, a red car on black asphalt, and a dress versus a person wearing the dress. The image vectorization module includes an image analysis module having an edge detection module and a semantic investigation module. The edge detection module detects edges in the raster image to create a contour map of multiple edges. The semantic investigation module also effectively identifies at least some of the semantic elements by recognizing image features based on detected edges, colors, patterns, textures, and so forth. Based on the contour map and the recognized image features, a segmentation module of the image vectorization module segments the raster image into multiple segments. The segments are organized or linked into a hierarchical segmentation tree in which each segment corresponds to a semantic element from the perspective of the application that has recognized image features of the raster image. The hierarchical segmentation tree enables the raster image to be analyzed at different levels of detail. For example, a high level of detail may include a background segment and a foreground segment. At a lower level of detail, the foreground segment may be further separated into a person segment, a car segment, and a bicycle segment based on recognized image features.

In example implementations, the image vectorization module includes a localized user control module to present a user interface that provides localized control of a vectorization operation on the picture of the raster image responsive to user input. The localized control pertains to a portion of the raster image, such as a particular area of a displayed raster image or a particular segment of a hierarchical segmentation tree. In operation, the localized user control module detects a user control signal, such as activation or movement of a user interface tool (e.g., a brush tool). The user control signal indicates the portion of the raster image for which a localized vectorization characteristic is to be adjusted. Thus, the image vectorization module produces a vector image that corresponds to at least part of the picture based on the multiple segments and the adjusted localized vectorization characteristic. The adjusted localized vectorization characteristic enables different spatial portions of the raster image to be vectorized using a different vectorization characteristic as compared to one applied to other portions or to one for a default or global setting. The localized user control module includes a denoising module, a segment splitting module, or a segment merging module to implement one or more locally-adjusted vectorization techniques.

In one example technique, a localized vectorization characteristic is adjusted by changing a level of intensity for a denoising operation. Noise in an image includes visual distortion such as splotchy dots, discoloration, or graininess. The denoising module removes noise from a raster image prior to edge detection so that the segmentation can focus on the actual semantic elements of the picture as represented by the image features of the raster image. In an example implementation, the localized user control module detects where a user marks an area of the raster image with an indicator tool. In response, an intensity of the denoising operation in the vicinity of the indicated area is increased or decreased such that the denoising module removes more noise or less noise, respectively, from the indicated area as compared to other areas of the raster image. For instance, some marking can entail positively changing and other marking can entail negatively changing a global intensity level of denoising in the localized areas around the different markings. Alternatively, multiple areas can be marked, and the localized user control module can present a user interface slider. Responsive to user manipulation of the slider, the denoising module increases or decreases the local intensity level of denoising around the marked areas to a degree established by a current setting of the slider. In this manner, the denoising module can scrub noise from areas of the raster image that suffer from noise while avoiding an unintentional blurring of other areas having less noise with an overly-intense denoising operation.

In another example technique, the localized vectorization characteristic is adjusted by changing an automated segmentation by accessing a higher level of detail in a hierarchical segmentation tree. In operation, an image display module overlays segments of the automated segmentation on a displayed raster image. The segment splitting module detects a zone of a selected segment as marked by a user with an indicator tool, such as a brush. Based on the indicated zone and the hierarchical segmentation tree, the segment splitting module splits the selected segment into two segments. Thereafter, the two separate segments can be individually selected or deselected for other operations, including a vectorization of a picture of a raster image. In this manner, one displayed segment that happens to include two semantic elements from a particular user's perspective can be split so that a desired segmentation is achieved that reflects the currently desired two different semantic elements with two separate segments. Accordingly, the image vectorization module can transform the edges of desired semantic elements into corresponding vector elements after a segment splitting procedure.

In yet another example technique, a localized vectorization characteristic is adjusted by changing an automated segmentation by accessing a lower level of detail in a hierarchical segmentation tree. In operation, an image display module overlays segments of the automated segmentation on a displayed raster image. The segment merging module detects that two or more segments are indicated by a user with an indicator tool, such as if a user brushes across two different segments. Based on the user indication of the two segments and the hierarchical segmentation tree, the segment merging module merges the two segments into a combined segment that is present at a lower level of detail. Thereafter, the combined segment can be selected or deselected as an atomic unit for other operations, including a vectorization of a picture of a raster image. In this manner, if two image features of the raster image were identified as being separate semantic elements by the image vectorization module in accordance with a default segmentation, but the two image features are considered a single semantic element by the user, the image vectorization module can re-characterize the two image features into a single segment responsive to user input. Accordingly, if a part of what the user considers the foreground was segmented into the background, the image vectorization module can cause the background-segmented part to be added to a foreground segment using a segment merging procedure controlled by user input.

In other example implementations, the image vectorization module includes a semantic information incorporation module that incorporates semantic information, which is gleaned from the picture of the raster image based on recognized image features, and incorporates the semantic information into the vector image. The semantic investigation module of the image vectorization module analyzes the raster image to recognize image features, which serve as a proxy for the semantic elements of the picture. Thus, the semantic information incorporation module can effectively identify the semantic elements of the picture from the perspective of the application by recognizing image features of the raster image. For instance, a semantic element may be identified by recognizing any one or more of the following image features: pixels having the same color, pixels contributing to the same texture, pixels being within a same contour that is bounded by a detected edge, or a combination thereof. A vector image production module of the image vectorization module determines vector elements representative of at least part of a vector version of the picture. Each vector element can include a mathematical formula for a geometric shape or a colorization related thereto.

The semantic information incorporation module therefore generates semantic metadata based on the recognized image features serving as a proxy for identified semantic elements. To enable the semantic information to survive the vectorization, the semantic metadata is incorporated into the vector image. More specifically, the semantic information incorporation module can individually or jointly associate the vector elements with the semantic metadata. For example, vector elements that correspond to a same image feature are grouped together using tags or a correspondence table as being related to the same semantic element. The image vectorization module produces the vector image by bundling together the vector elements and the associated semantic metadata. In this manner, semantic information present in the original raster image can be ported over to the converted vector image to enhance subsequent editing or other manipulation. Accordingly, a number of vector elements that are related to each other by virtue of being derived from a common image feature can be easily selected together and then jointly manipulated. In this context, a common semantic element can include, for example, the leaves growing on a tree, a person, or a group of red hearts on a blue background.

In the following discussion, after some example terminology is set forth, an example environment is described that may employ the techniques described herein. Example embodiment systems, apparatuses, and techniques are then described, followed by a section explaining example embodiment procedures and processes. The procedures and processes may be performed in the example environment and systems as well as in other environments. However, performance of the example procedures is not limited to the example environment, and the example environment and systems are not limited to performance of the example procedures.

Terminology Examples

Example descriptions or explanations of certain terms as used herein are set forth below. Each term is applicable to one or more, but not necessarily all, embodiments presented herein. Some terms are further elucidated using one or more examples.

A "raster image" refers to a bitmapped image formed from pixels. A raster image can be defined, for example, by specifying a color value for each pixel of a two-dimensional (2D) grid of pixels. An example of a raster image is a photograph from a camera sensor or a scanned image. A raster image may therefore include bitmap data. Depending on context, the term "raster image" may connote a visually-discernable image formed from bitmap data or a file containing the bitmap data.

A "vector image" refers to an image formed from vector elements. A "vector element" refers to a mathematical construct such as an equation or formula. Examples of vector elements include lines, curves, geometric shapes, and combinations thereof. A vector image may include vector data describing how to draw or render a vector graph using the mathematical constructs. Depending on context, the term "vector image" may connote a visually-discernable image formed from vector data or a file containing the vector data. A "vector version of picture" refers to a picture that is drawn or rendered using vector elements.

A "vectorization" refers to a conversion or transformation of a raster image to a vector image. With a "vectorization operation," a version of a picture that is formed from an array of pixels is converted to another version of the same picture that is formed from vector elements.

"Local control" refers to guidance, direction, or a command that pertains to a part of a whole and is not global. A "portion of a raster image" refers to a part of raster image that is less than the entirety of the raster image picture or file. A "spatially-localized user control" refers to a control input by a user or a control enabled for a user that is applicable to a visual portion of a raster image that is less than the entirety of the raster image. For example, spatially-localized user control can pertain to a proper subset of pixels from the set of pixels that form an entirety of a raster image.

A "picture" refers to an aspect of an image that is visually-discernable to the human eye or perceptible to the human mind Examples of a picture include a house, a person, a birthday party, a sunset, a table populated with food and place settings, or some combination thereof. A picture can include one or more semantic elements.

A "semantic element" refers to an aspect of a picture that is identifiable with respect to other aspects of the picture from the perspective of a person. A semantic element may include an object, item, or part of a raster image that has a separate meaning A semantic element can connote an idea independently of other semantic elements. Examples of semantic elements include a blanket, a word or a letter, a crowd or an individual person, a building, a car, an insect, a corner of a table or of a room, a couple, a meal, an area of color, a steak, a field or a flower in the field, or some combination thereof. What constitutes a semantic element is somewhat subjective. Whether an aspect of a given picture is considered a semantic element can vary from person to person. Moreover, what is considered a relevant semantic element for a given picture can vary for a single person depending on a current purpose or interpretation. A semantic element from the perspective of an application is inferred based on image features.

An "image feature" refers to an aspect of a raster image that can be recognized by a module as having a common or similar visual appearance or as being separable from other aspects of a raster image. Examples of an image feature include an edge, a color, a pattern, a texture, a gradient, a shape, an object, or a combination thereof. Because semantic elements are subjective from a human perspective and not consistently detectable with certainty through an automated mechanism, systems and techniques that are described herein use image features as a proxy attribute or surrogate for the semantic elements of a picture corresponding to a raster image. Thus, at least one semantic element of a picture can be effectively or implicitly identified by recognizing one or more corresponding image features of a raster image. Accordingly, the term "semantic element" as used herein with regard to an application or module thereof may refer to an image feature.

"Semantic metadata" refers to indications of semantic elements of a raster image that are extracted from the raster image for independent usage. The semantic metadata may include associations between vector elements of vector data and semantic elements identified in bitmapped data of the raster image. An "association" between vector elements and semantic metadata refers to a linkage of multiple vector elements of a vector image to at least one semantic element of a raster image. An association may group vector elements using tags, containers, a table, etc. to facilitate joint editing or manipulation of vector elements that pertain to a same semantic element.

A "segment," which is also called a region, may refer to a part of a raster image that is separately identifiable. A segment may correspond, for example, to a semantic element of the raster image. A "segment" may also refer to a portion of, such as a leaf of, a hierarchical segment tree. A "segmentation" refers to dividing a picture of a raster image into multiple segments. The segments can be based on corresponding semantic elements of a picture that are separable from one another, at least at different levels of detail. A module can empower a user to select a segment of a picture of a raster image in a segment selection mode. Segments can also be organized into a hierarchical segmentation tree.

A "hierarchical segmentation tree" refers to an organization applied to the semantic elements of a picture. A hierarchical segmentation tree can be realized as a data structure that links different segments based on a relationship between or among their corresponding semantic elements. Segments are organized into different levels of detail, such as from a higher level of detail to a lower level of detail. For example, a picture may have a first level that includes a background segment and a crowd segment that is in the foreground. A next lower level of the hierarchical segmentation tree can further segment the crowd into segments of individual people.

A "user control signal" refers to user input via a mouse, touch screen, voice, etc. that is intended to control some aspect of a vectorization operation. Examples of user control signals include a click to select a segment, a movement of an indicator tool, an indication of an area or zone of a raster image, a brush stroke, a painting over a part of a picture, selection or activation of a local vectorization control mode, selection of at least part of a displayed segment indicator, or some combination thereof.

A "localized vectorization characteristic" refers to a parameter, a mode, a control input, a linking or relationship between different segments, etc. that impacts how a vectorization operation is performed on a local, or non-global, level. A value, condition, or state of the localized vectorization characteristic pertains to some spatial subset of an entire raster image. Examples of a localized vectorization characteristic include a denoising intensity level, whether adjacent segments are split, whether adjacent segments are merged, a level of detail of a hierarchical segmentation tree at which segments are analyzed for splitting or merging purposes, whether two segments are located on or exposed as being on a same level of a hierarchical segmentation tree, a grouping of vector elements in accordance with a semantic element, or some combination thereof.

A "denoising operation" refers to the removal of noise from a picture of a raster image. An intensity level of a denoising operation can be changed by a user in a spatially-local manner prior to vectorization to tune the results of the vectorization operation.

A "segment splitting procedure" refers to splitting a segment into at least two segments based on a user's indicated marking while a segment splitting mode is active. The splitting is also based on an underlying hierarchical segmentation tree. A vectorization operation can be based on the two segments that result from the splitting procedure.

A "segment merging procedure" refers to merging at least two segments into a fewer number of segments, such as merging at least two segments into one combined segment. The merging of segments is based on a user's indicated marking of two or more segments while a segment merging mode is active. The merging is also based on an underlying hierarchical segmentation tree. A vectorization operation can be based on the combined segment that results from the merging procedure.

Also, unless context dictates otherwise, use herein of the word "or" may be considered use of an "inclusive or," or a term that permits inclusion or application of one or more items linked by the word "or" (e.g., a phrase "A or B" may be interpreted as permitting or being relevant to just "A," to just "B," or to both "A" and "B"). Further, items represented in the accompanying figures and terms discussed herein may be indicative of one or more items or terms, and thus reference may be made interchangeably to single or plural forms of the items and terms in this written description.

Example Environment

FIG. 1 illustrates an environment 100 for example embodiments that are operable to employ techniques described herein that relate to enhanced vectorization of raster images. As illustrated, the example environment 100 includes at least one computing device 102, at least one user input/output (I/O) device 124, and at least one user 106. FIG. 1 also depicts a user interaction between the user 106 and the user I/O device 124 that produces a user control signal 126. The computing device 102 includes a processing system 116 and a memory 118. The processing system 116 includes an operating system 120. The memory 118 includes an application 122, which includes an image vectorization module 104. Example implementations for the computing device 102 are described further below in this section.

As shown on a display screen associated with the computing device 102, the application 122 may be realized as an image manipulation application, such as a photography program or a graphic arts design program. The image manipulation application manipulates an image 108 responsive to user input. For example, the user 106 can resize the image 108 by cropping or scaling the displayed image, can change a visual appearance of the image 108 by adjusting colors or brightening the displayed image, or can change a format by adjusting a file type of the image 108. Additionally, the user 106 can change content by adding objects to or removing objects from the image 108, can convert between a raster version and a vector version of the image 108, and so forth.

To enable the user 106 to manipulate the image 108, the image manipulation application presents a user interface having one or more user interface features. The user interface features can be implemented as tools 128, settings 130, menu options, user modes, combinations thereof, and so forth. Responsive to user input via a tool 128, the image manipulation application modifies the image 108. Examples of tools 128 include a selection tool, a brush tool, a paint tool, and an effects tool. To enable the user 108 to easily see a current state of the image 108 or how a tool will affect or has affected the image 108, the image manipulation application displays a number of settings 130. Responsive to user input via a setting 130, the image manipulation application changes an appearance of the image 108 or how a tool impacts the image 108. Examples of settings 130 include a color palette, a selected font, a layer indication, and a set of options for a currently-selected tool of the tools 128. Although shown in the context of a device that enables touch-screen interaction, the tools 128, the settings 130, etc. of the image manipulation application can alternatively be utilized via mouse, touchpad, voice interaction, or some combination thereof. In operation, the image manipulation application detects where user input is indicated via at least one tool 128. For example, the image manipulation application ascertains the location of an indicated portion of a raster image by mapping a position of a currently-active user interface tool 128 to displayed pixels of the raster image.

The image 108 includes a picture (not explicitly shown within the display screen of the computing device 102) that may be life-like, abstract, photo-realistic, etc. and that is discernable to the human eye. By manipulating the image 108, the picture thereof is likewise manipulated. An example of an image manipulation is a vectorization operation 114. Two example versions of the image 108 are shown at the top of the environment 100: a raster image 110 and a vector image 112. With the vectorization operation 114, the raster image 110 is converted into the vector image 112.

A hand-drawn decorative vine is shown in the example pictures of the raster image 110 and the vector image 112.

The raster image 110 is a photograph of the decorative vine as drawn on the spiral notebook with the depicted pencil. After the vectorization operation 114, the bitmap version of the hand-drawn decorative vine of the raster image 110 is isolated and converted into the smooth, vectorized version of the decorative vine for the vector image 112. Enhancements for vectorization operations 114 are described below in the following sections.

The computing device 102 may be implemented as any suitable type of computing device. Examples of end-user implementations for the computing device 102 include a desktop computer, a laptop or notebook computer, a mobile device (e.g., assuming a handheld configuration such as a mobile phone, a phablet, or a tablet—which is depicted in FIG. 1), a mobile device coupled to a separate screen, an entertainment appliance such as a smart television, a game console, a wearable computing device such as a smart watch or intelligent glasses, or some combination thereof. Thus, an end-user implementation of the computing device 102 may range from relatively high-resource devices with substantial memory and processor resources (e.g., personal computers or game consoles) to relatively low-resource devices with constrained memory or processing resources (e.g., mobile devices such as wearables). Examples of data center or server device implementations for the computing device 102 include a web server, a server running open source software, a server of a proprietary design, a stand-alone server, a server blade, an allocated portion of a server farm, server functionality that is distributed across at least one data center, cloud computing functionality, or some combination thereof.

The computing device 102 is illustrated as including a variety of hardware components: a processing system 116, an example of a computer-readable storage medium illustrated as memory 118, and so forth. Other hardware components are also contemplated as described herein below with reference to FIG. 17. The processing system 116 is representative of functionality to perform operations through execution of instructions stored in the memory 118. Although illustrated as two separate components, functionality of these two components may be combined into one component (e.g., on an application specific integrated circuit (ASIC) or as instructions are loaded from memory onto a processor) or may be further divided into a greater number of components. Examples of a user I/O device 124 include a keyboard, a mouse, a touchpad, a touch screen, a microphone, a camera, a display device such as a screen or projector, a speaker, or some combination thereof. The user I/O device 124 may be separate from, or integrated with, the computing device 102. The computing device 102 is further illustrated as including an operating system 120. The operating system 120 is configured to abstract underlying functionality of the computing device 102 to the application 122 that is executable on the computing device 102.

In example implementations, an image vectorization module 104 is located at or executing on the computing device 102, such as by being part of the application 122 or the operating system 120. The image vectorization module 104 represents functionality to implement schemes and techniques for enhanced vectorization of raster images as described herein. The image vectorization module 104 may be implemented as at least part of a software package that executes on and specially configures one or more processors, which processors may physically realize the processing system 116; as a hardware apparatus, which may be realized as an ASIC or as the computing device 102; or using a combination of software, hardware, firmware, or fixed logic circuitry; with some combination thereof; and so forth. As described herein below with reference to FIG. 17, the image vectorization module 104 may be fully or partially implemented as a web or cloud-based image manipulation service.

Systems and Techniques

This section describes some example details of systems and techniques for enhanced vectorization of raster images in accordance with one or more embodiments.

Figure 2:
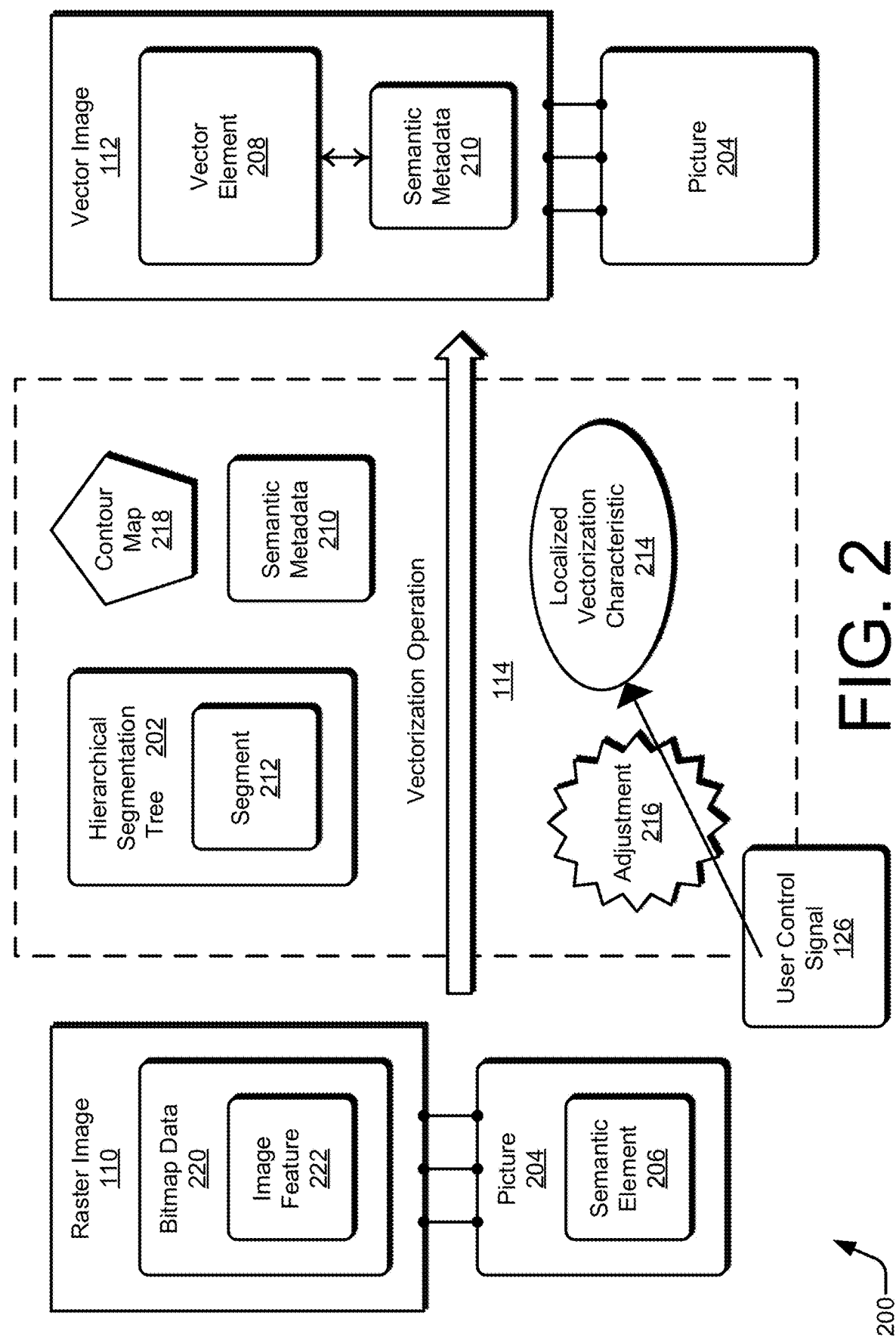
FIG. 2 is a schematic diagram illustrating aspects of an example vectorization operation to convert a raster image to a vector image.

FIG. 2 is a schematic diagram 200 illustrating aspects of an example vectorization operation 114 to convert a raster image 110 to a vector image 112. The raster image 110 includes bitmap data 220 that corresponds to a version of a picture 204 having multiple semantic elements 206. An image feature 222 is part of or is integrated with the bitmap data 220. The vector image 112 includes vector elements 208 that correspond to another version of the picture 204. The vector image 112 also includes semantic metadata 210 that is associated with the vector elements 208.

In some embodiments, the vectorization operation 114 includes, utilizes, or produces a contour map 218, a hierarchical segmentation tree 202 that has multiple segments 212, the semantic metadata 210, a localized vectorization characteristic 214, and an adjustment operation 216. The adjustment operation 216 pertains to adjusting the localized vectorization characteristic 214 based on the user control signal 126. In the vectorization operation 114, the bitmap data 220 of the raster image 110 is analyzed to detect edges and produce the contour map 218. In conjunction with the contour map 218, the bitmap data 220 is further analyzed to identify semantic elements 206 of the picture 204 by recognizing the image features 222.

Given the image features 222 and the contour map 218, the picture 204 is segmented to produce multiple segments 212 that are organized into the hierarchical segmentation tree 202. Using the hierarchical segmentation tree 202, the user can be afforded an opportunity to affect the vectorization operation 114 by adjusting the localized vectorization characteristic 214. For example, the segments 212 that are to be vectorized may be adjusted through a splitting procedure or a merging procedure. The adjusted segments are then vectorized to produce the vector elements 208 for the vector image 112.

In the following description, an example image vectorization module 104 that includes multiple modules to perform different phases of the vectorization operation 114 is described with reference to FIG. 3. Examples of a contour map 218 and a hierarchical segmentation tree 202 are described with reference to FIGS. 4A and 4B, respectively. Different example adjustment operations 216 are described with reference to FIGS. 5-11. Specifically, a denoising adjustment, a segment splitting adjustment, and a segment merging adjustment are described with reference to FIGS. 5, 6-8, and 9-11, respectively. Incorporating the semantic metadata 210 into the vector image 112 is described with reference to FIGS. 12-14.

Figure 3:
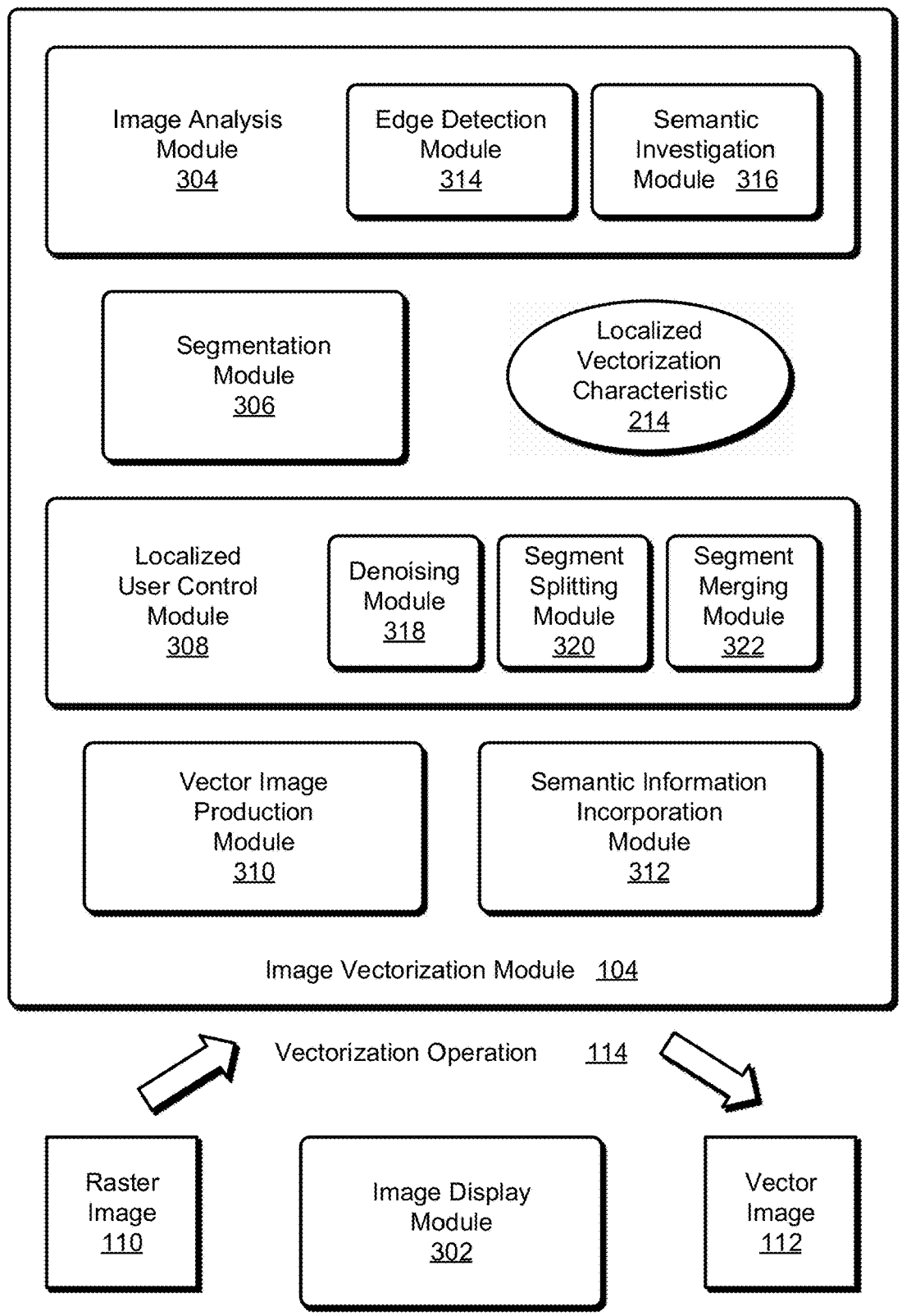
FIG. 3 illustrates an example of an image vectorization module.

FIG. 3 illustrates, generally at 300, an example of the image vectorization module 104. FIG. 3 also illustrates the raster image 110, the vector image 112, and an image display module 302. The image display module 302 can display the raster image 110 or the vector image 112 on a display screen associated with the computing device 102 (of FIG. 1). Additionally, the image display module 302 can present intermediate aspects of a vectorization operation 114, such as a contour map, different segments or segmentation layers, various vector elements, and so forth.

As illustrated, the image vectorization module 104 includes an image analysis module 304, a segmentation module 306, a localized user control module 308, and a vector image production module 310. The image vectorization module 104 further includes a semantic information incorporation module 312 and at least one localized vectorization characteristic 214. The image analysis module 304 includes an edge detection module 314 and a semantic investigation module 316. The localized user control module 308 includes a denoising module 318, a segment splitting module 320, and a segment merging module 322.

In one or more embodiments, the image analysis module 304 analyzes the raster image 110 to detect edges and identify semantic elements. Specifically, the edge detection module 314 uses a color thresholding procedure on the bitmap data 220 (of FIG. 2) of the raster image 110 to detect edges in the picture 204 by determining variances in colors of adjacent pixels that exceed a color difference threshold (e.g., in terms of hue or shade). The semantic investigation module 316 analyzes the bitmap data 220 to identify patterns in the colorization of the raster image 110, such as common colors or textures, to recognize image features. The semantic investigation module 316 can also analyze the bitmap data 220 to recognize known shapes or objects, such as a table or a face. Using patterns and objects that have been recognized, in conjunction with detected edges, the semantic investigation module 316 recognizes image features 222 as a proxy for identifying actual semantic elements 206 of the picture 204. Based on the edges and the feature information, the image analysis module 304 tunes the detected edges to produce the contour map 218, which is described with reference to FIG. 4A. For example, edges that correspond to individual image features can be grouped together. The segmentation module 306 uses the contour map 218, including the tuned edges, and the image features 222 to derive the multiple segments 212. Further, the segmentation module 306 produces the hierarchical segmentation tree 202, which is described with reference to FIG. 4B.

The localized user control module 308 presents a user interface to receive user input that impacts the vectorization operation 114 in a localized portion of the raster image 110. The localized user control module 308 adjusts the localized vectorization characteristic 214 based on the user control signal 126. Three different user control modules for three different user control modes are explicitly shown in FIG. 3. The control modes are: a denoising mode, a segment splitting mode, and a segment merging mode. The denoising module 318 locally adjusts an intensity of a denoising operation responsive to user input as described with reference to FIG. 5. With the segment splitting module 320 and the segment merging module 322, the localized user control module 308 accepts user input to control the vectorization operation 114 after the raster image 110 is initially segmented but before the edges of the raster image 110 are converted to vector elements. The segment splitting module 320 splits a segment into two segments responsive to user input as described with reference to FIGS. 6-8. The segment merging module 322 merges two segments into one combined segment responsive to user input as described with reference to FIGS. 9-11.

The vector image production module 310 produces vector elements 208 (of FIG. 2) for the vector image 112 based on displayed, selected, or highlighted segments 212 of the hierarchical segmentation tree 202. The vector elements 208 represent a vector version of the picture 204. The semantic information incorporation module 312 incorporates the semantic metadata 210 into the vector image 112 for use when subsequently manipulating the vector image 112 or the vector elements 208 thereof. The semantic information incorporation module 312 produces the semantic metadata 210 by associating respective groups of vector elements 208 with one or more image features 222 that serve as a proxy to semantic elements 206. Operation of the semantic information incorporation module 312 is described with reference to FIGS. 12-14.

Figure 4A:
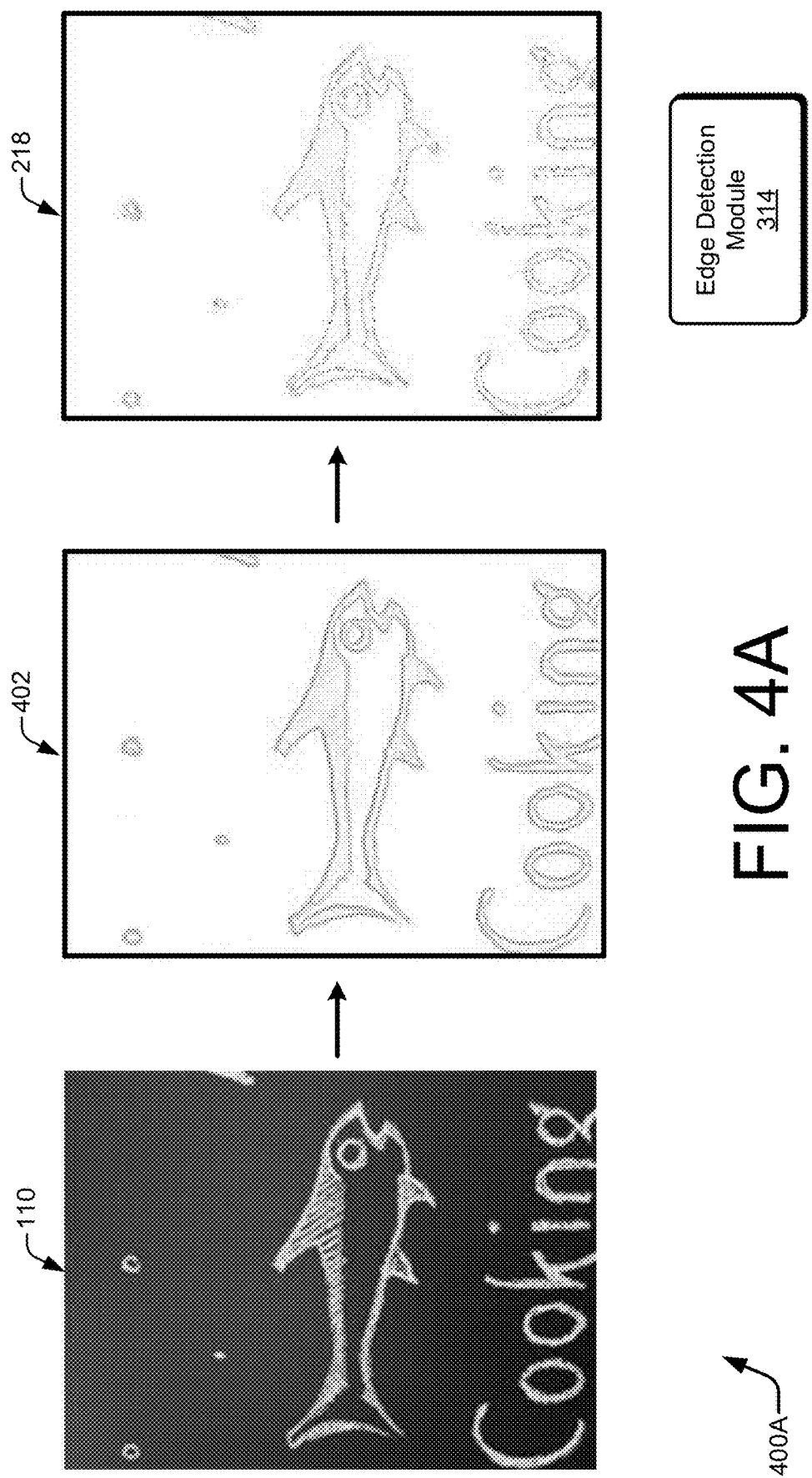
FIG. 4A illustrates an example production of a contour map.

FIG. 4A illustrates an example production 400A of a contour map 218. As illustrated, the production 400A includes a raster image 110, a contour probability map 402, and the contour map 218. The image analysis module 304 (of FIG. 3) accepts as input the raster image 110. In FIG. 4A, the raster image 110 has a picture of a swimming fish with the word "Cooking" underneath the fish. In operation, the edge detection module 314 detects edges of the raster image 110. In an example implementation, a structure edges approach based on random forest prediction is used to detect edges; however, other approaches may be utilized. The detected edges are used to predict a contour probability map 402. Multiple oriented edge probability maps are approximated using steerable filters (not shown). Here, the image analysis module 304 uses eight steerable filters to obtain eight orientated edge probability maps.

In the illustrated example, the contour map 218 is implemented as an ultrametric contour map (UCM). However, the contour map 218 may be implemented in an alternative manner. An oriented watershed transform (OWT) is used to produce a set of initial regions from the output of a contour detector. The ultrametric contour map is then constructed from the boundaries of initial contour regions. As a result, the contour signal is transformed into a hierarchy of regions while the contour quality is also preserved. Regions, which are also called segments herein, can be predefined for exposure to the user based on a hierarchical segmentation tree with a preset level of details. In a user selection mode, user interface functionality detects if the user scribbles over portions of the raster image 110, which scribbling is indicative of user selection of one or more segments. This scribbling thus indicates which underlying segments are to be grouped for the user. The grouped segments can be visually highlighted for the user.

Figure 4B:
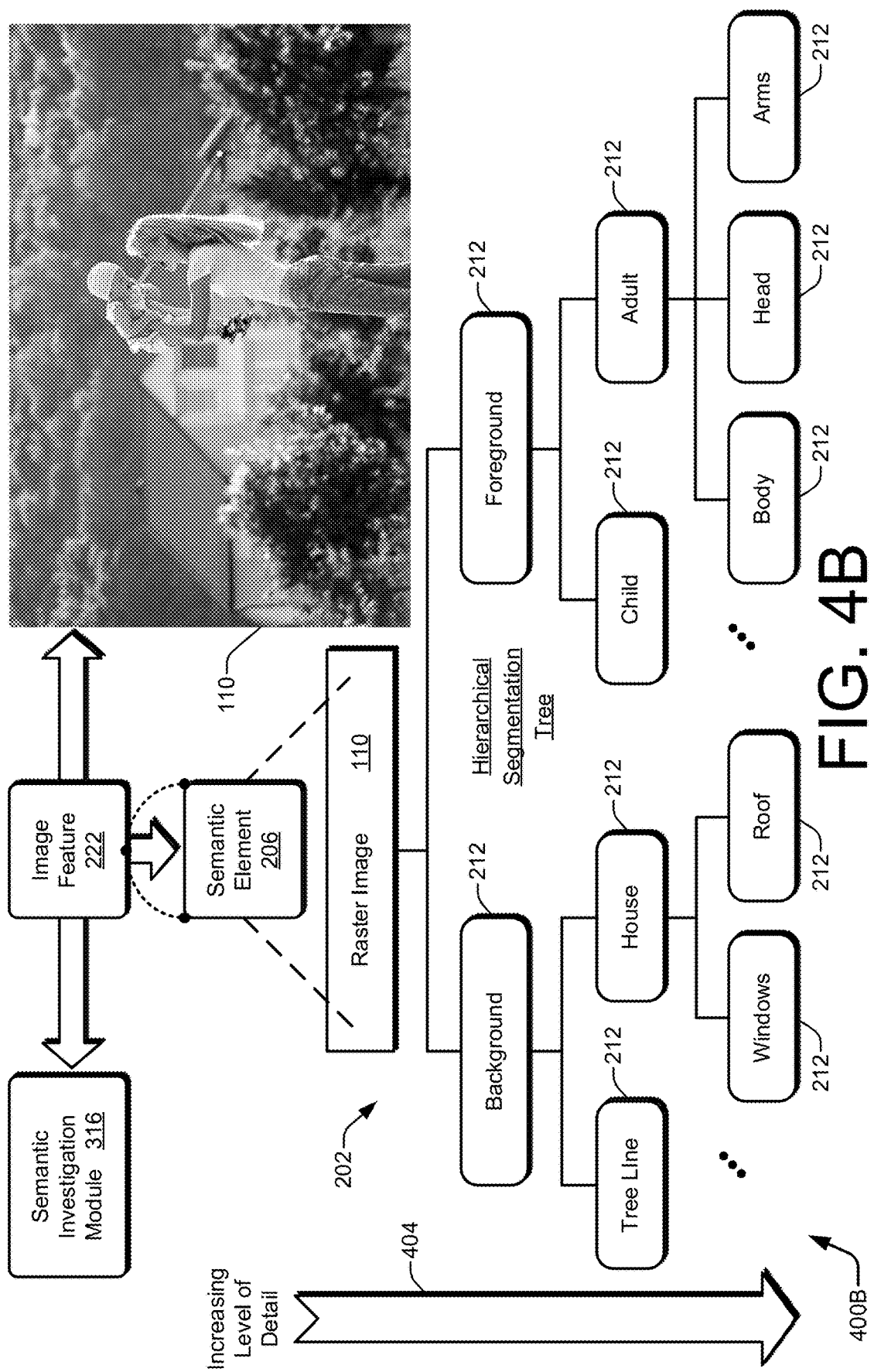
FIG. 4B illustrates an example of a hierarchical segmentation tree.

FIG. 4B illustrates generally at 400B a raster image 110 and an example of a hierarchical segmentation tree 202 that is derived from the raster image 110. The hierarchical segmentation tree 202 includes multiple segments 212, which correspond to segments or regions of the raster image 110. The image analysis module 304 produces the hierarchical segmentation tree 202 based on the contour map 218 (of FIGS. 2 and 4A) and the image features 222.

In an example operation, the semantic investigation module 316 recognizes multiple image features 222 in the raster image 110. The image features 222 serve as a proxy for the semantic elements 206 of the picture of the raster image 110. The multiple segments 212 correspond to recognized image features 222 and represent semantic elements 206 that are potentially discernable by a user. The multiple segments 212 are distributed over the hierarchical segmentation tree 202, which is organized in accordance with different levels of detail. As indicated by the arrow 404, a level of detail increases as the hierarchical segmentation tree 202 is descended.

The raster image 110 of FIG. 4B is a picture of a woman holding a baby in front of a row trees, which is in front of a house. The example hierarchical segmentation tree 202 has a first level including a background segment and a foreground segment. On a next lower level, the background segment is separated into a house segment and a tree line segment. The foreground is separated into child and adult segments on this level. On a still lower level, which is the lowest illustrated level, the house segment is separated into a windows segment and a roof segment. On this lowest illustrated level, the adult segment is separated into three segments: body, head, and arms. Although not shown, the tree line segment and the child segment may be separated into additional segments at the lowest illustrated level. Moreover, each segment of the lowest illustrated level may be further separated into smaller segments in a lower, non-illustrated level. For example, the head segment may be separated into hair, eyes, nose, and mouth segments.

In one implementation, a default level of detail of an initial automated segmentation is presented for the user. Thus, the image vectorization module 104 makes the segments of this default level of detail available for selection by the user by overlaying the default segmentation on a displayed raster image. Alternatively, the image vectorization module 104 can present to the user a user interface control feature, such as a slider, that changes a displayed scale of the segmentation. If the image vectorization module 104 detects that the slider feature is adjusted by user input, the image display module 302 adjusts the available level of detail to increase or decrease a level of detail displayed for the segments in accordance with the hierarchical segmentation tree 202. For example, the image vectorization module 104 can start the user at the background-foreground level of detail. If the user moves the slider to increase a level of detail, the image vectorization module 104 displays, and thus gives the user access to, the tree line, house, child, and adult segments of the next higher level of detail. Accordingly, the image vectorization module 104 can modify the number of different segments that are visually indicated or made available to the user for individual selection responsive to a user-indicated setting.

Figure 5:
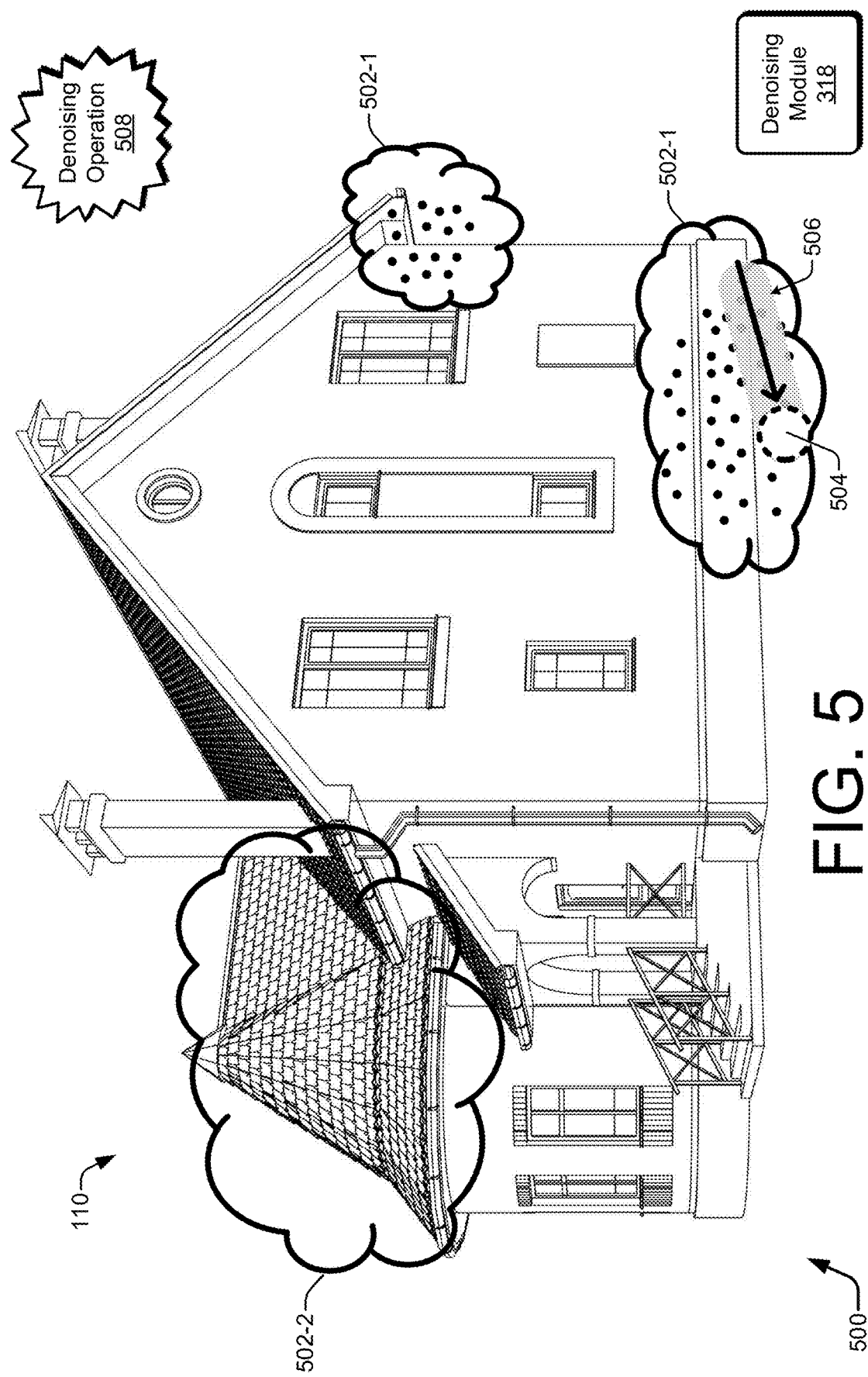
FIG. 5 illustrates a visual example of localized user control for a denoising operation.

FIG. 5 illustrates a visual example 500 of localized user control for a denoising operation 508. The visual example 500 includes a raster image 110 having a picture of a house and an indicator tool 504. The indicator tool 504 may have a flexible size or shape and is used to draw over portions of the raster image 110. Generally, an image manipulation application may provide the user with an opportunity to globally adjust an intensity of the denoising operation 508. Noise can therefore be more or less aggressively removed. Unfortunately, a global adjustment is insufficient to fine tune the denoising, especially when a picture has spatially-varying image details or amounts of noise. With reference to FIG. 5, highlight clouds 502 emphasize portions of the picture of the raster image 110. The highlight clouds 502-1 emphasize portions that include unsightly and distracting noise, as represented by the large dots. The noise can also complicate or clutter the results of a vectorization operation. The highlight cloud 502-2 emphasizes a portion that does not have noise, but this portion does include finer details with sharper edges for roofing shingles. If the noise removal intensity is increased globally, the roofing shingles in the highlight cloud 502-2 can be blurred. On the other hand, if the noise removal intensity is decreased globally such that the roofing shingles are not blurred, the actual noise in the highlight clouds 502-1 is not removed sufficiently.

The denoising module 318 detects a local portion of the raster image 110 that is indicated by a user. The user input is indicative of where an intensity of the denoising operation 508 is to be adjusted, such as by increasing or decreasing the intensity with respect to a default or current global intensity setting. The user can move the indicator tool 504 over parts of the raster image 110 to provide a user control signal 126 (of FIGS. 1 and 2) to indicate an area 506 in which a denoising intensity is to be adjusted. The denoising module 318 detects the user control signal 126 and ascertains the indicated area of the raster image 110 based thereon. For example, after the user paints in the vicinity of the highlight clouds 502-1, the denoising module 318 increases the intensity of a noise removal operation in those two spatially-localized portions. The other non-indicated portions may be denoised in accordance with a default or global denoising setting. Additionally or alternatively, the user can move the indicator tool 504 in the vicinity of the highlight cloud 502-2 to indicate an area in which the intensity of a noise removal operation is to be decreased. In this alternative example, the denoising module 318 decreases the intensity of a noise removal operation in that one spatially-localized portion. The denoising operation 508 is performed prior to the vector image production and can be performed prior to the segmentation or edge detection.

An example implementation of the denoising operation 508 is described below from a quantitative perspective. Based on the user's movement of an indicator tool 504, such as a brush, over the area 506, the denoising module 318 generates an intensity map M, where each pixel represents the brush strength. A real-time local bilateral filter is then applied based on the user's brush as follows:

$$I^*(x) = 1/W_p \sum_{x_i \in N(x)} I(x) * f_r(|I(x_i) - I(x)|) * g_s(x_i - x)$$

where I is the original input image, $W_p$ is a normalization factor, $g_s$ is a spatial kernel, and $f_r$ is a range kernel estimated from M as given by:

$$f_r(|I(x_i) - I(x)|) = e^{-|I(x_i) - I(x)|^2/\sigma_x^2}$$

and $$\sigma_x = k * M(x)$$

With the user's brush, the standard deviation of the range kernel is changed in a local manner, which results in edge-preserving smoothing being targeted along the brush region.

Figure 6:
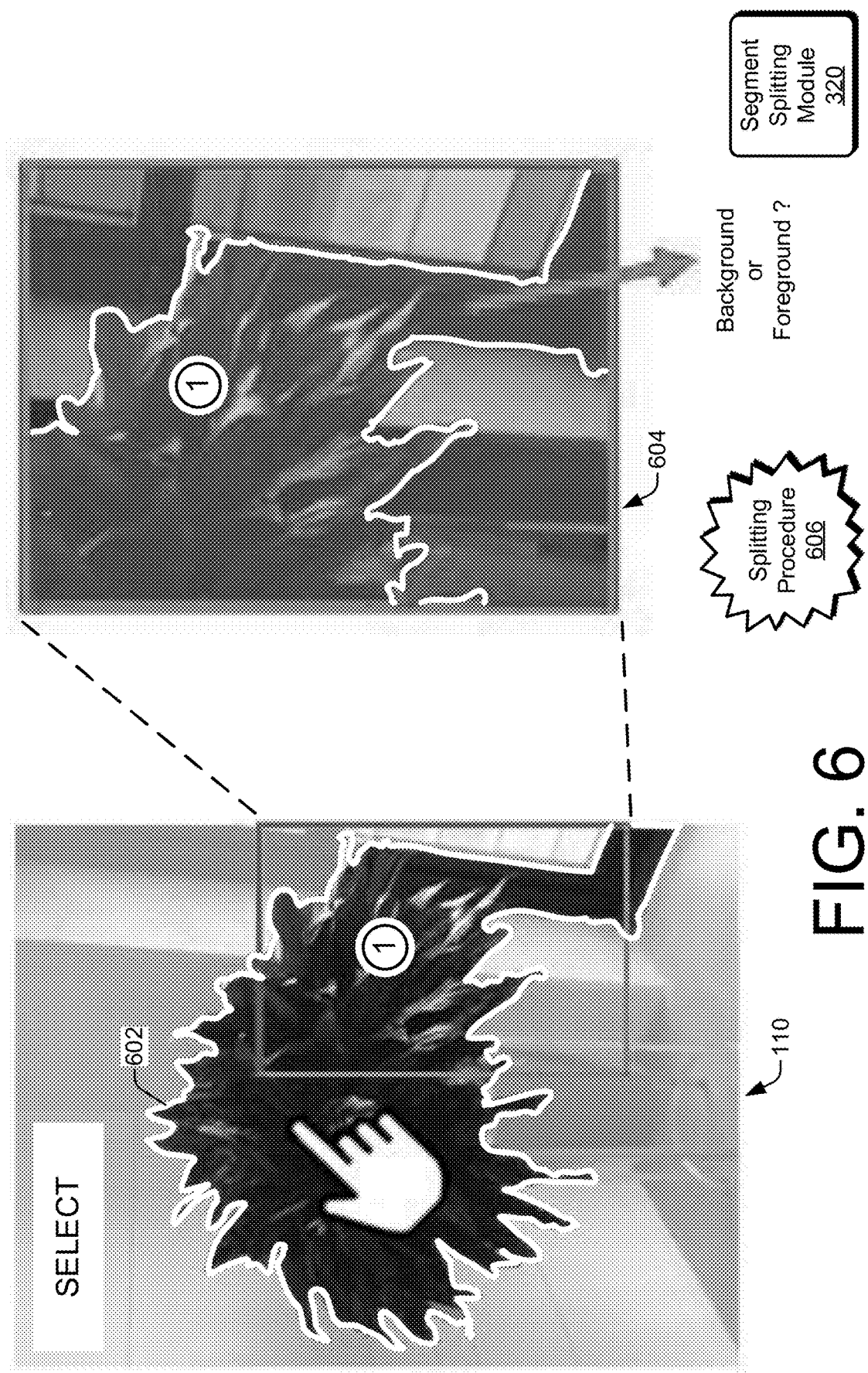
FIGS. 6 and 7 illustrate a visual example of localized user control for a segment splitting procedure.
Figure 7:
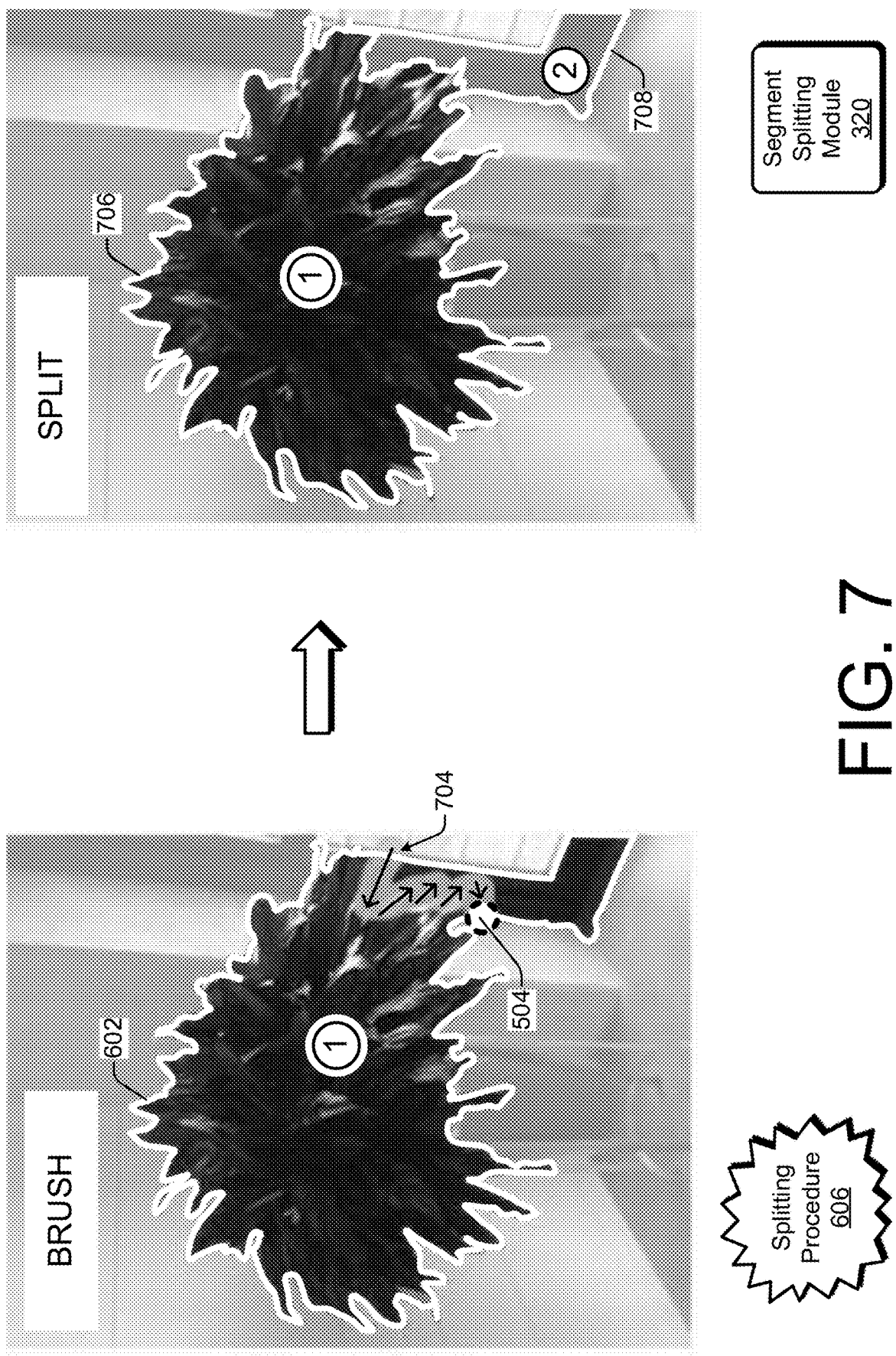

FIGS. 6 and 7 illustrate a visual example of localized user control for a segment splitting procedure 606. With the segment splitting procedure 606, one segment is split into at least two segments. On the left of FIG. 6, a raster image 110 has a picture of a dark green plant in front of a white corner of a room next to a window. On the left, a user select mode is active. Using the finger-pointing hand, the user can select a segment. Here, the user is attempting to select the plant in the foreground. As indicated by the encircled "1," one segment 602 is selected. This selected segment 602 includes the plant and a portion of the window, specifically the bottom left corner of the window frame is included in the selected segment 602. In other words, the segmentation of the raster image 110 has incorrectly segmented the picture such that part of the window frame in the background has been mistaken as part of the plant in the foreground.

On the right of FIG. 6, an enlarged view 604 is shown of a portion of the raster image 110. For context, different segments of the enlarged view 604 are shaded different levels of gray. Corner edges of a column in the corner of the room are so indicated. Similarly, parts of the window frame and shutter planks are indicated with different gray levels. As is apparent from the enlarged view 604, the automated segmentation operation was unable to differentiate the window frame as being solely part of the background or solely part of the foreground. However, the segment splitting module 320 can split the selected segment 602 based on a user control signal 126 (of FIGS. 1 and 2).

On the left of FIG. 7, a brush phase is active for the segment splitting mode. The segment splitting module 320 detects user input indicative of where the selected segment 602 should be split into two segments. As shown, the indicator tool 504 has been brushed by the user along a zone 704. To implement the splitting procedure 606, the segment splitting module 320 searches the hierarchical segmentation tree 202 to find an edge at a lower level of detail that matches the brush marks of, or cut made by, the zone 704. The matching edge is used to split the selected segment 602. On the right of FIG. 7, a split phase for the segment splitting mode is shown in which the single segment has been split into two segments. In the split phase, the segment 602 is split into a first segment 706 and a second segment 708, as indicated by the encircled "1" and "2." The first segment 706 corresponds to the plant in the foreground. The second segment 708 corresponds to a portion of the window frame at a lower level of detail for the background.

Figure 8:
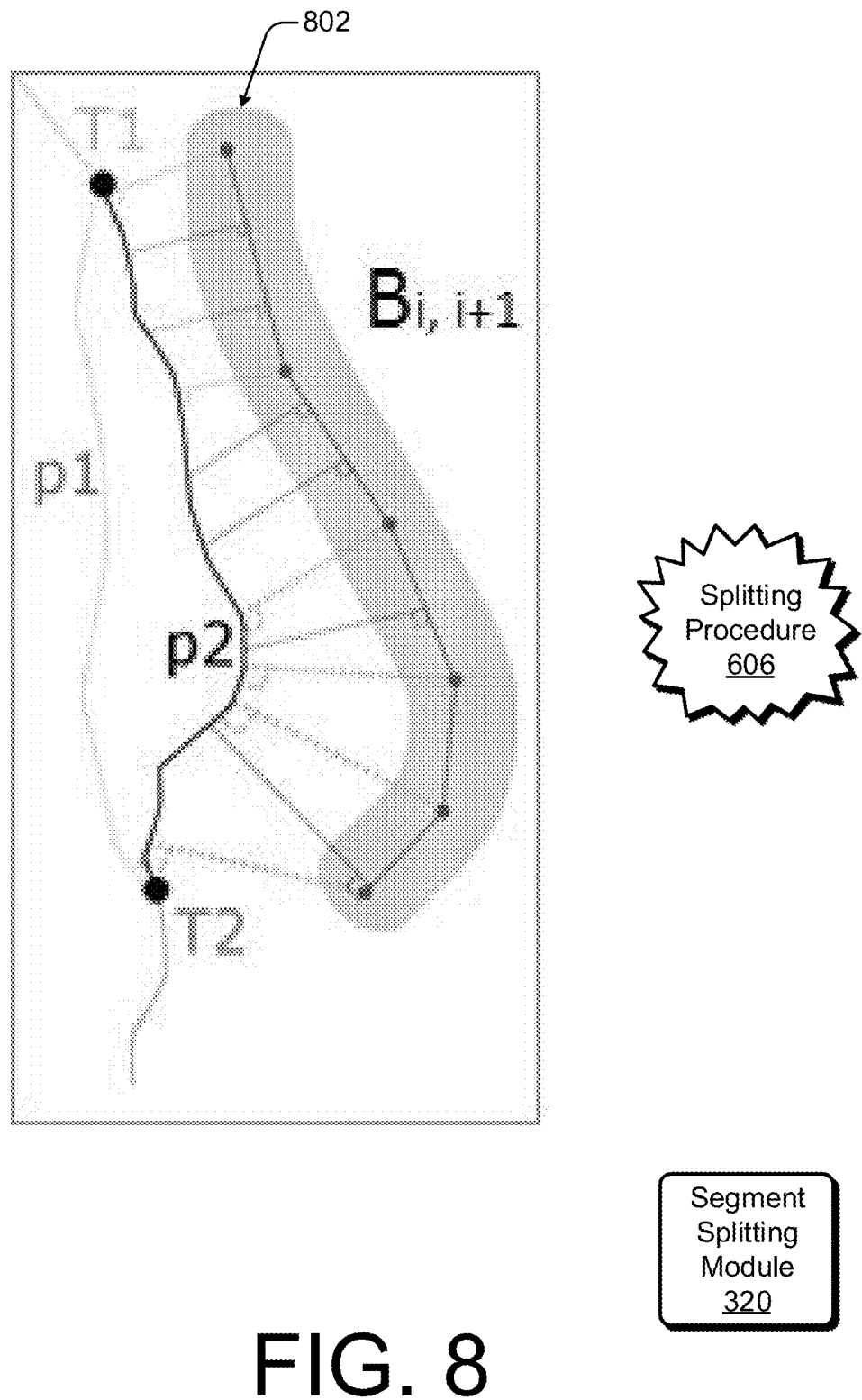
FIG. 8 illustrates a quantitative example of localized user control for a segment splitting procedure.

FIG. 8 illustrates a quantitative example of localized user control for a segment splitting procedure 606 based on a zone indicated by a user's brush stroke 802. Given the user input brush stroke segment $B_{i,i+1}$, a shortest path between the closest T-junctions to the starting and ending control points of the stroke segment are determined. The shortest path is subject to the minimization of edge intensity and matching cost.

To implement the segment splitting procedure 606, a graph G is initially constructed in which each node represents a T-junction from an ultrametric contour map and each edge represents contours of the ultrametric contour map that are connected by two adjacent T-junctions. When the user places a cut, the segment splitting module 320 finds two T-junctions that are closest to the starting and ending control points of the user's brush stroke 802, which indicates the zone 704 (of FIG. 7). The splitting procedure 606 includes finding a partial ultrametric contour map edge such that the total cost defined below is minimized.

The segment splitting module 320 updates the edge weight of the graph G as follows:

$$W(B,P)=\text{EdgeIntensity}(P)+\lambda \text{MatchingCost}(B,P).$$

More specifically, the EdgeIntensity is defined as the arc weight of the ultrametric contour map (e.g., the smaller the weight, the greater the likelihood the edge is a contour). The MatchingCost encodes the similarity between the shape of the optimal path and the user's stroke 802 (B). By way of example, the Hausdorff distance is used to describe the similarity between the user's stroke B and the underlying path P that is the target of the investigation as shown in Equation (1):

$$\text{MatchingCost}(B,P)=\max(\max_{b \in B}\min_{p \in P}(\text{dist}(b,p)), \max_{p \in P}\min_{b \in B}(\text{dist}(b,p))) \quad (1)$$

In the MatchingCost equation, the variable b represents each control point along the user stroke B, and the variable p is the sampled points along the path P. The function dist(x, y) implies the Euclidean distance between the 2D points x and y. By way of example, a greedy-based method is used to find the optimal path P: Given a user's brush stroke B ($b_1$, $b_2$, ... $b_N$) and the graph G, for each i=1 ... N−1:
1. For stroke segment ($b_i,b_{i+1}$), find the closest T-junction $T_i,T_{i+1}$ to $b_i$ and $b_{i+1}$, respectively.
2. Update the graph weights of G according to Equation (1).

3. Estimate the shortest path $P_i$ between $T_i$ and $T_{i+1}$ in G.

Figure 9:
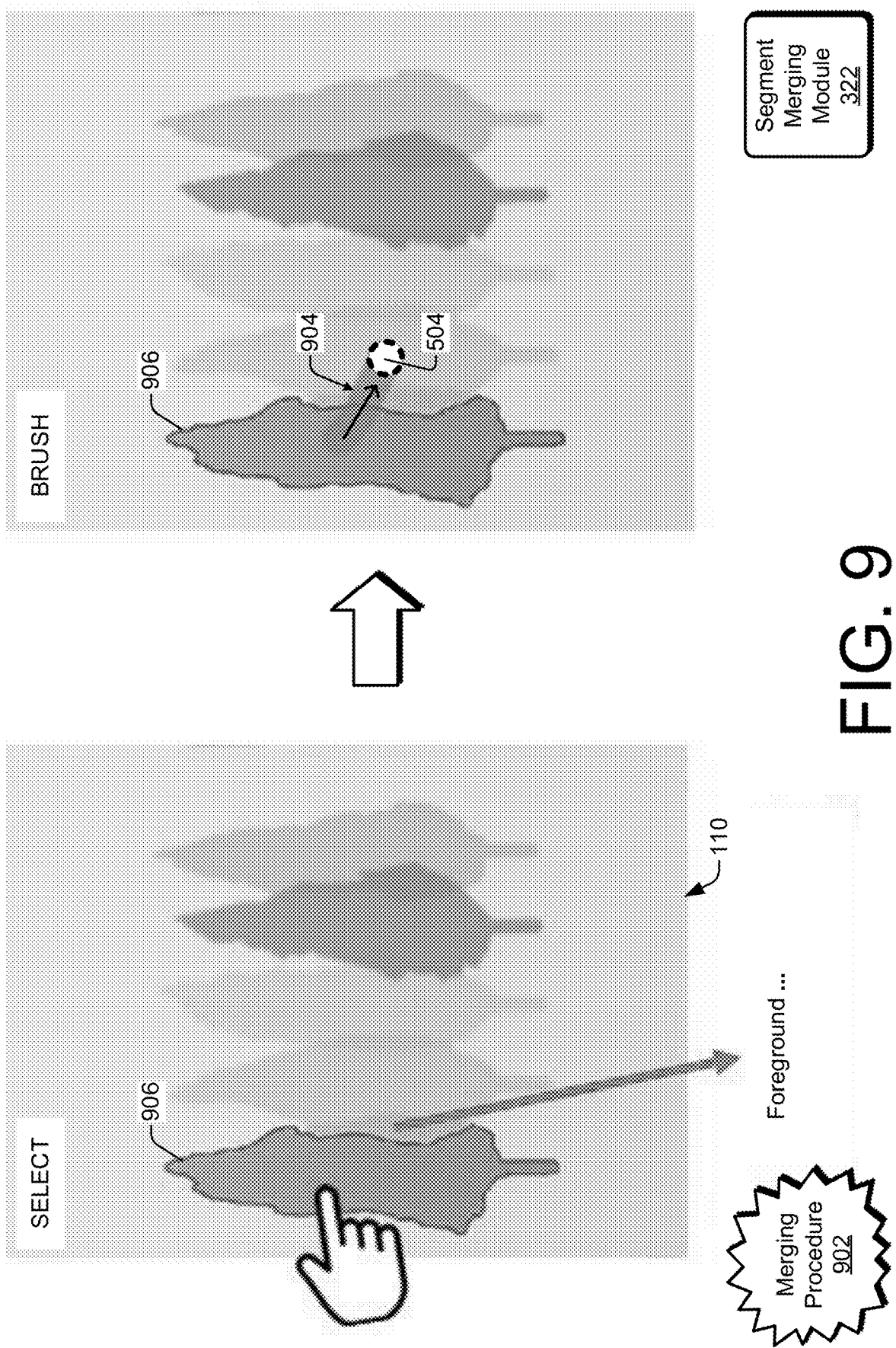

FIGS. 9 and 10 illustrate a visual example of localized user control for a segment merging procedure 902. With the segment merging procedure 902, two or more segments are merged so as to result in at least one less segment. For instance, two segments can be merged into one combined segment. On the left of FIG. 9, a raster image 110 has a picture of multiple trees that are tall, thin, and overlapping with each other. Each tree is segmented into multiple segments, partially due to the overlapping positioning. The automated segmentation is indicated with shades of gray. If a tree is in the front of the foreground, the user would prefer in this example that the entirety of such a tree is assigned to one segment. On the left, a user select mode is active in which the user can select a segment with the finger-pointing hand Here, the user is attempting to select the entirety of the tree in the foreground on the far left. However, a segment 906 is selected because the automated segmentation has incorrectly produced an additional segment that straddles the selected tree on the far left and the overlapping tree just to the right thereof.

The segment merging module 322 is capable of merging these two segments based on a user control signal 126 (of FIGS. 1 and 2). On the right of FIG. 9, a brush phase is active for the segment merging procedure 902. The user manipulates the indicator tool 504 to mark which two segments are to be combined using a bush stroke 904. In FIG. 10, the view of the example brush phase for the segment merging mode is repeated on the left. The segment merging module 322 detects which segments the indicator tool 504 covers with the brush stroke 904 to determine which segments are to be merged. Alternatively, the segment merging module 322 detects an edge that is crossed by the brush stroke 904 that separates two different segments to determine which segments are to be merged. On the right of FIG. 10, a merge phase shows a result of the segment merging procedure 902. The image reflects that the two segments have been combined into one selected tree segment 1002, as highlighted in the front of the foreground.

Figure 11:
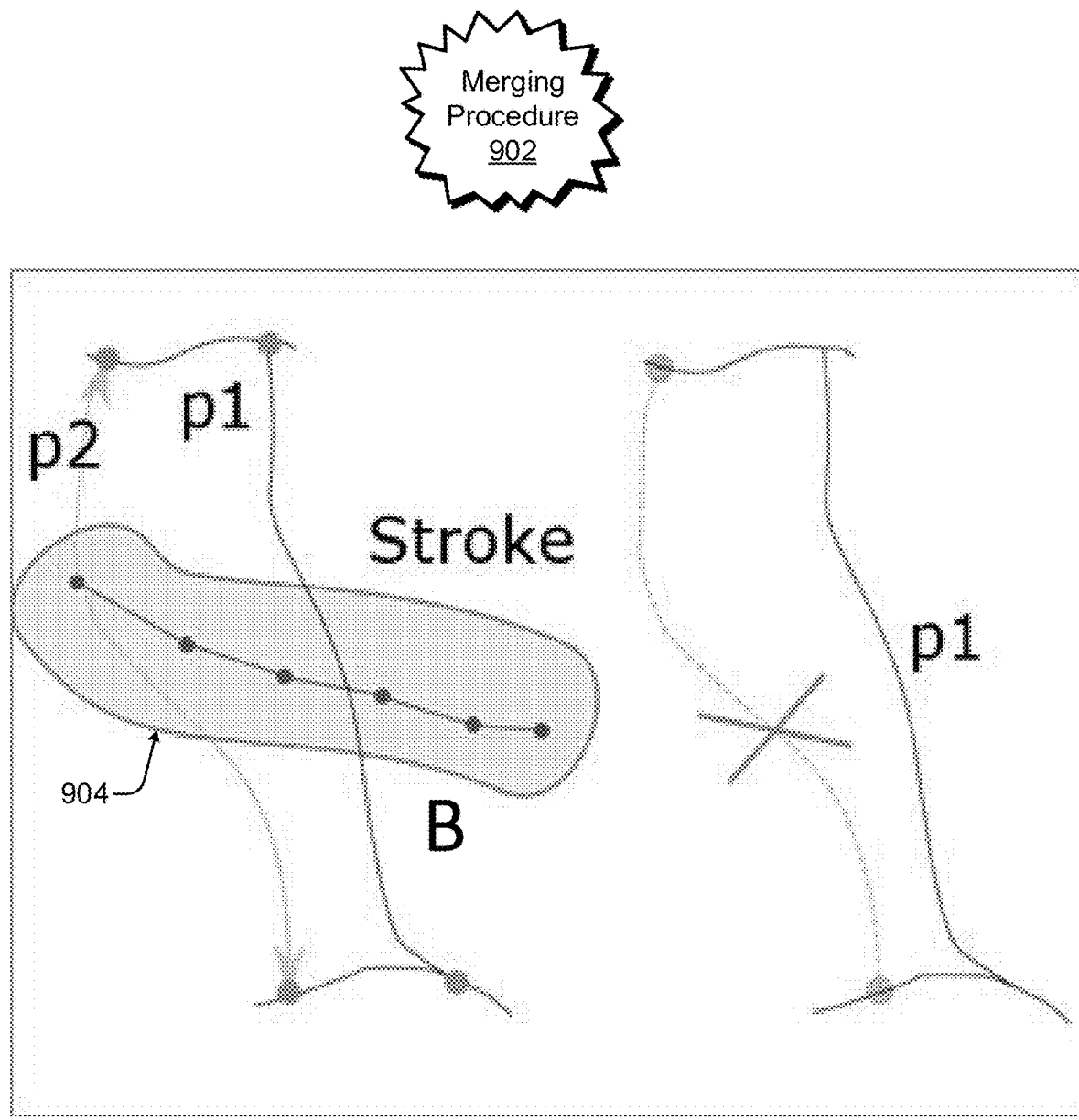
FIG. 11 illustrates a quantitative example of localized user control for a segment merging procedure.

FIG. 11 illustrates a quantitative example of localized user control for a segment merging procedure 902 based on a user's brush stroke 904. Given the user input brush stroke B, the segment merging module 322 examines the ultrametric contour map edges between two T-junctions that are covered by the brush stroke 904. The segment merging module 322 removes the edge with the weakest edge intensity.

To implement the segment merging procedure 902, a graph G is initially constructed in which each node represents a T-junction from the ultrametric contour map and each edge represents contours of the ultrametric contour map that are connected by two adjacent T-junctions. Given a user's brush stroke B ($b_1$, $b_2$, ... $b_N$) and the graph G, the segment merging module 322 first finds the ultrametric contour map edge segments between the two T-junctions that are covered by the stroke B. These edge segments are denoted as p={$p_1$, $p_2$, ... $p_N$}. The edge segment p* that has the weakest edge intensity is selected for removal. More formally, the segment merging module 322 selects the edge segment based on the following equation:

$$p^*=\text{argmax}(\text{EdgeIntensity}(p)).$$

Figure 12:
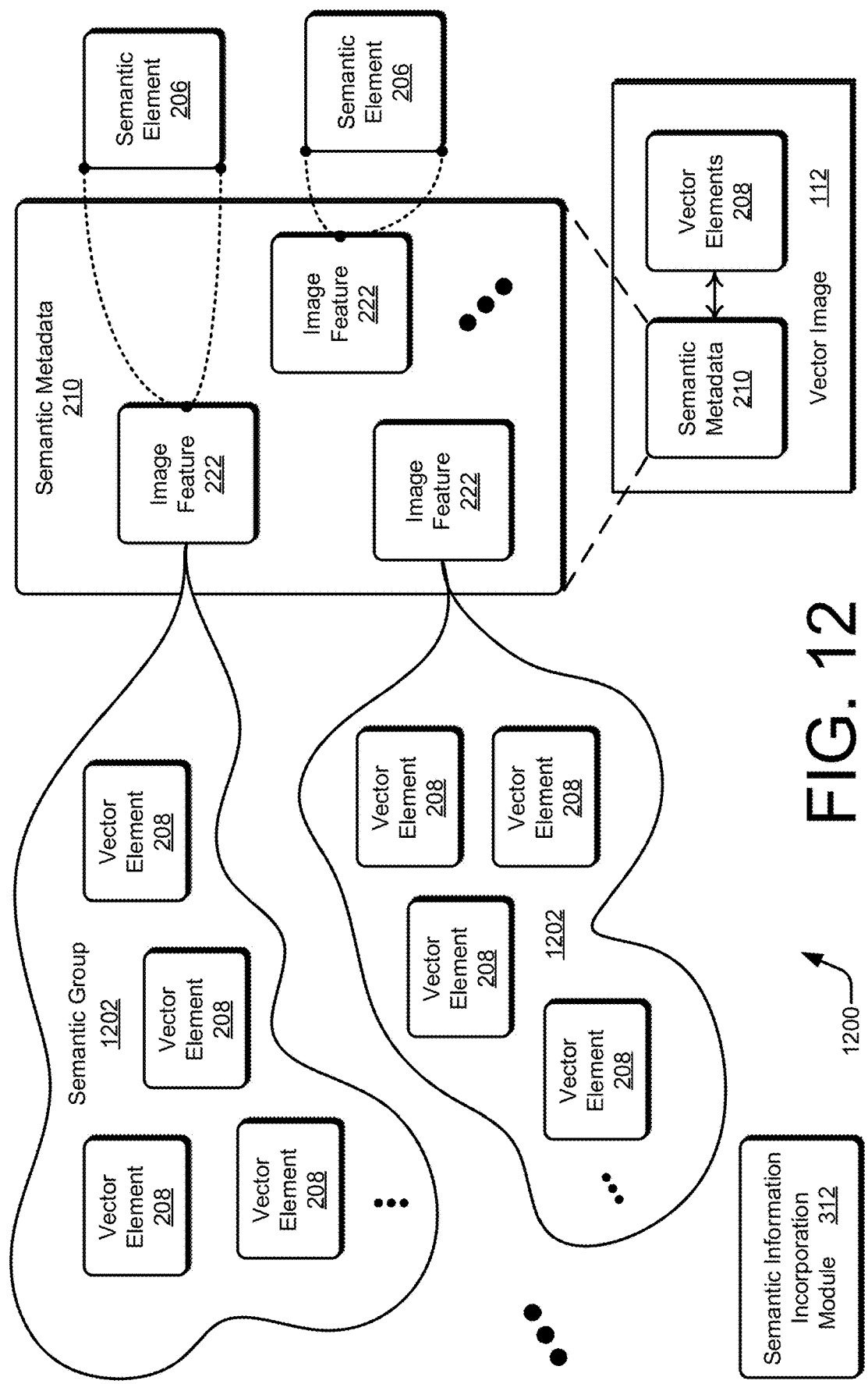
FIG. 12 is a schematic diagram illustrating an example approach to incorporating semantic information from a raster image into a vector image.

FIG. 12 is a schematic diagram 1200 illustrating an example approach to incorporating semantic information from a raster image into a vector image 112. Generally, the semantic information incorporation module 312 incorporates the semantic metadata 210 into the vector image 112. This incorporation enables the semantic information from the raster image 110 to survive the conversion to the vector image 112 so that the semantic information can be leveraged when manipulating the vector elements 208 of the vector image 112. For example, such semantic information incorporation can facilitate the joint selection of multiple vector elements 208 that each relate from the perspective of the application to a common semantic element 206 for implementation of a common operation, such as movement, scaling, or coloration. More specifically, the semantic information incorporation module 312 associates one or more of the vector elements 208 with one or more of the image features 222, which serve as a proxy for the semantic elements 206 that are discernable from the perspective of the user.

In some embodiments, multiple vector elements 208 that are associated with a given image feature 222 are grouped together into a semantic group 1202. The vector elements 208 assigned or belonging to a semantic group 1202 pertain to a given image feature 222, such as various instances of a common color or texture that may or may not be contiguous. To implement an association between vector elements and image features, the vector elements 208 of a semantic group 1202 may be co-located within a given container of the vector image 112. Alternatively, the vector elements 208 of a semantic group 1202 may each be tagged with the same indicator corresponding to a given image feature 222. In yet another alternative, a table that forms a part of the vector image 112 may link one or more vector elements 208 to a given image feature 222. Further, some combination of the foregoing or other implementations may be employed. Although not explicitly shown in the schematic diagram 1200, a vector element 208 may be associated with multiple image features 222.

An image feature 222 can be recognized from any one or more of many different bit patterns or attributes of the raster image 110 alone or in combination. Examples include similar or common colors, textures, or gradients. Proximity or object recognition can also contribute to a determination that one or more pixels form an image feature 222 acting as a substitute for a semantic element 206. Further, direct segmentation information can be incorporated into the vector image 112 (e.g., each pixel is associated with an identifier corresponding to a unique segment). For instance, areas of the raster image 110 with the same color or texture are likely to be attached to a single segment 212. Also, text letters with similar colors can be organized into a joint semantic group 1202. Other examples of semantic information that can be incorporated into the vector image 112 include: layout information, an image salient feature (e.g., a corner), over-segmentation information (e.g., super pixels), or some combination thereof.

Figure 13:
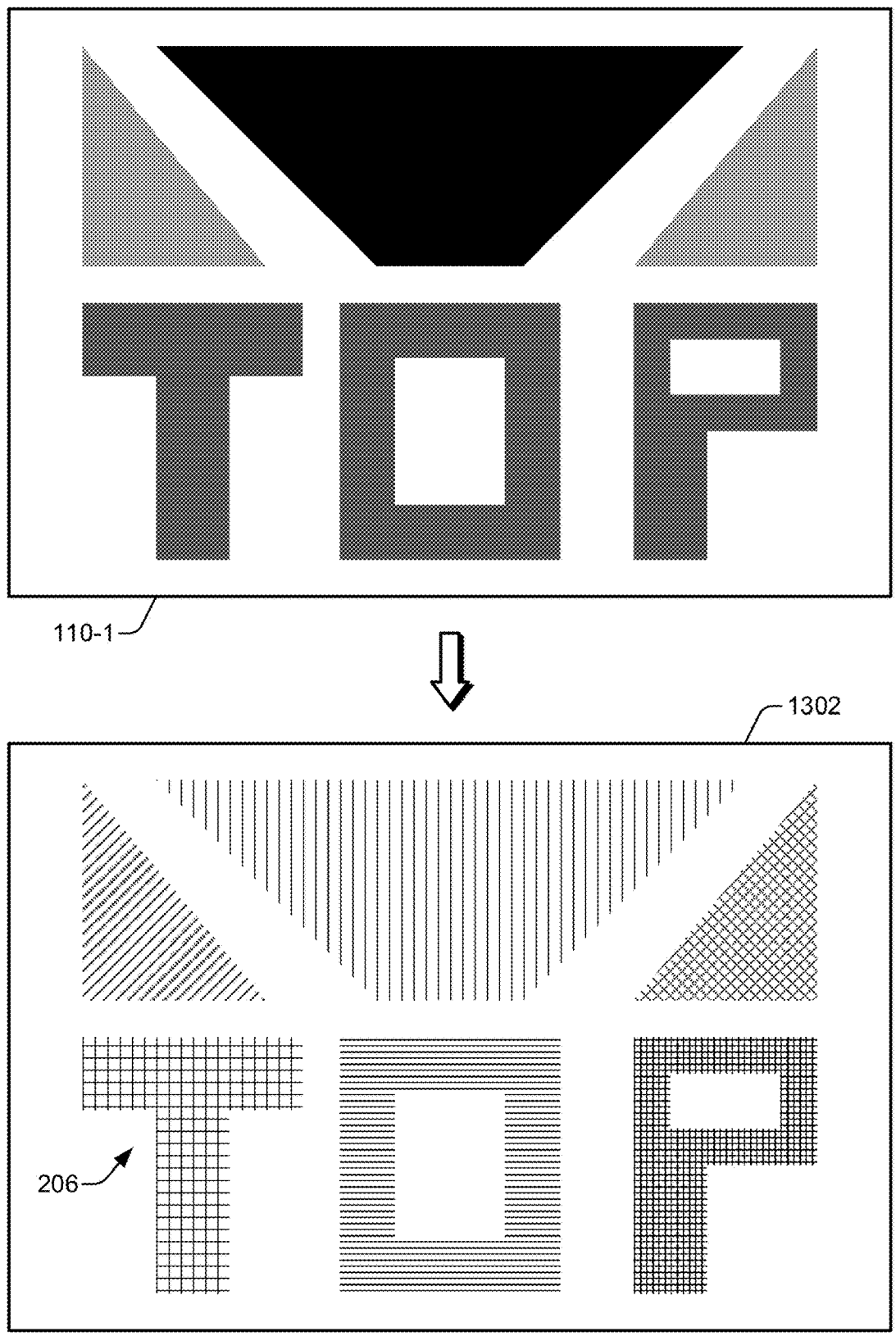

FIGS. 13 and 14 illustrate a visual example of incorporating semantic information from a raster image 110-1 into a vector image 112-1 and 112-2. Each image pertains to an example logo having three geometric shapes and three letters. The three geometric shapes from left to right are a first triangle, a trapezoid, and a second triangle. The three letters are "T O P." The per-pixel level segmentation is computed for the hierarchical segmentation tree 202 (of FIGS. 2 and 4). The semantic information incorporation module 312 can attach this semantic information to the vector graph output as the vector image 112-1 or 112-2. As a result, the lines, curves, shapes, etc. of the vector elements 208 in the vector graph can be grouped to aid further editing of a design in the vector form. At the top of FIG. 13, the raster image 110-1 provides the original shape and color input. An image 1302 at the bottom of FIG. 13, shows a semantic segmentation. The vector image 112-1 at the top of FIG. 14 depicts a black-and-white edge response, and the vector image 112-2 at the bottom of FIG. 14 illustrates the vector image with the semantic information attached.

As represented by different shades of gray in the raster image 110-1 at the top of FIG. 13, the two triangles are a first color, the trapezoid is a second color, and the three letters are a third color. At the bottom of FIG. 13, an image 1302 is depicted that shows a visual example of multiple semantic elements 206 as a result of the semantic segmentation. The different semantic elements 206 are indicated using different forms of cross-hatch fill patterns. In operation, the segmentation module 306 (of FIG. 3), in conjunction with the semantic investigation module 316, produces the data for the image 1302 from the raster image 110-1. At the top of FIG. 14, a vector image 112-1 is depicted that shows a visual example of multiple vector elements 208 resulting from a vectorization operation 114 applied to the raster image 110-1 of FIG. 13. The vector image 112-2 at the bottom of FIG. 14 visually indicates, in addition to the vector elements 208, the semantic elements 206. The different semantic elements 206 are indicated with different forms of light and dark dotted fill patterns. On a color display screen, different colors may be substituted for different fill patterns to indicate to a user different semantic elements 206 of the vector image 112-2.

Having discussed example details of systems, techniques, and schemes for enhanced vectorization of raster images, consider now some example procedures to illustrate additional aspects of the techniques.

Example Procedures

Figure 15:
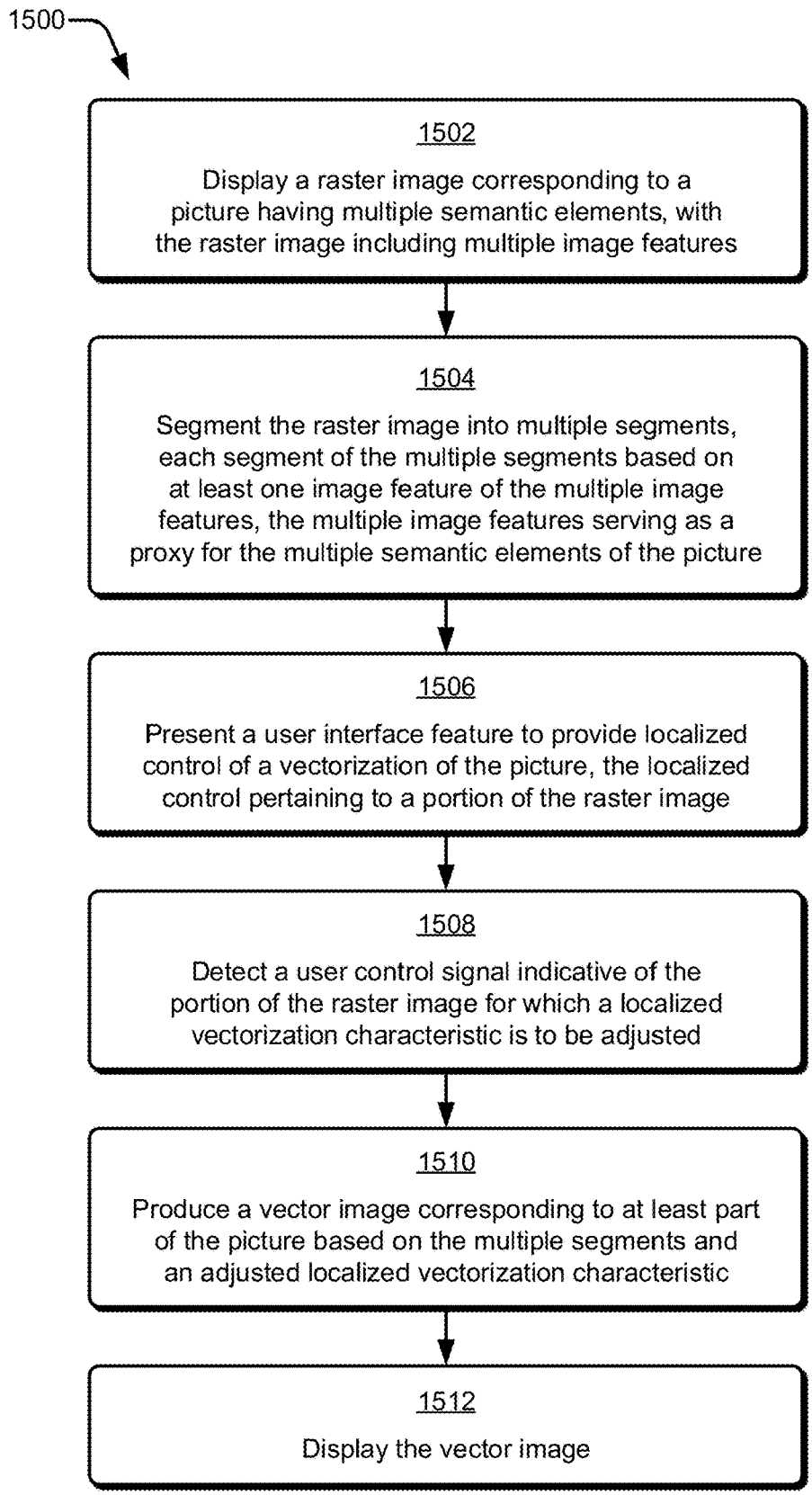
FIG. 15 is a flow diagram illustrating an example procedure in accordance with one or more example embodiments.
Figure 16:
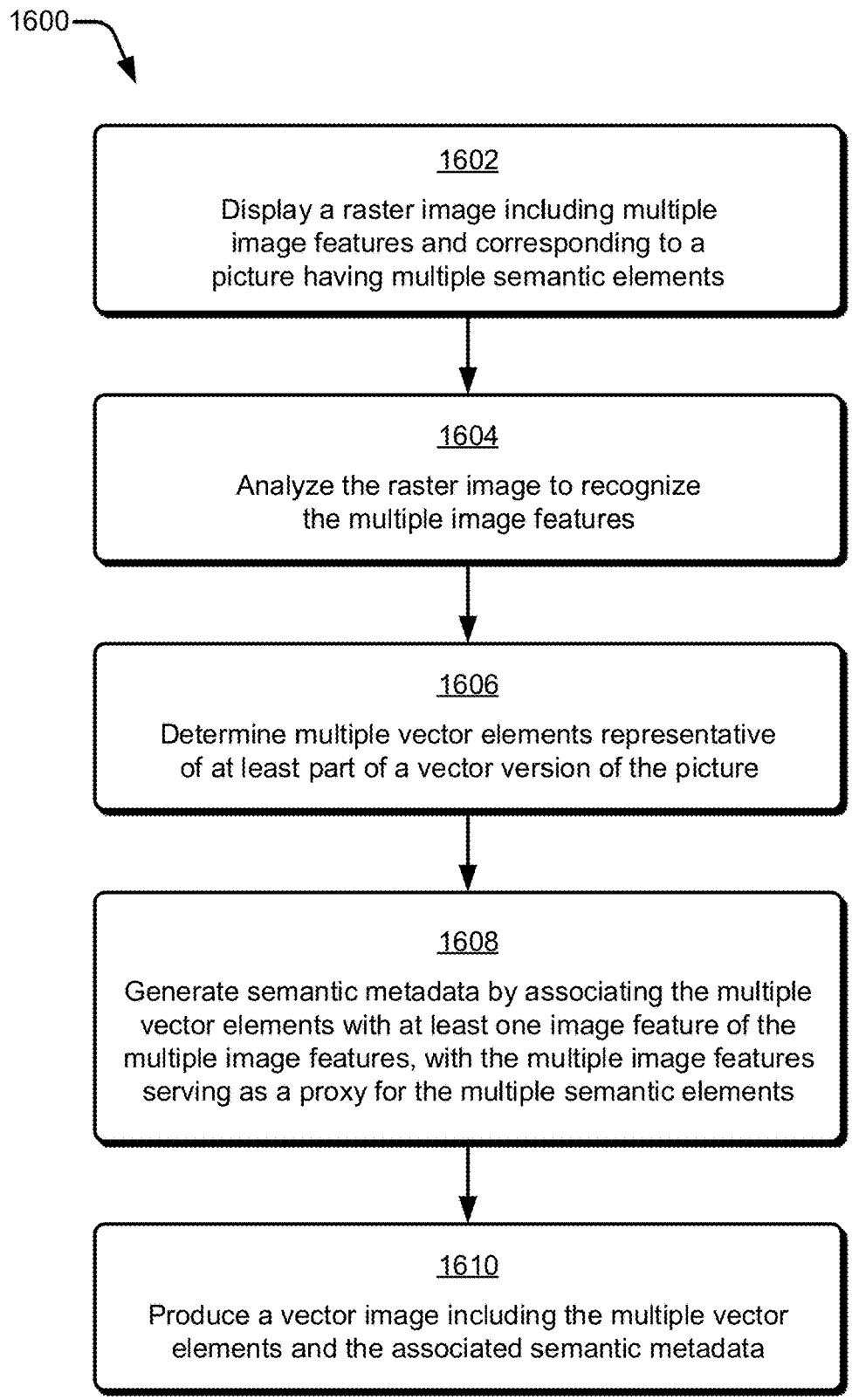
FIG. 16 is another flow diagram illustrating another example procedure in accordance with one or more example embodiments.

This section describes with reference to FIGS. 15 and 16 example procedures relating to enhanced vectorization of raster images in one or more embodiments. Aspects of the procedures may be implemented in hardware, firmware, or software, or a combination thereof. The procedures are shown as sets of blocks specifying operations that may be performed by one or more devices, but performance of the operations is not necessarily limited to the orders as shown by the respective blocks or as described herein, for the operations may be performed in other orders or in fully or partially overlapping manners. In at least some embodiments, the procedures may be performed by a suitably configured device, such as an example computing device 102 (of FIG. 1) or 1602 (of FIG. 16) using an image vectorization module 104 (e.g., of FIGS. 1, 3, and 16).

FIG. 15 is a flow diagram 1500 including six blocks 1502-1512 and illustrating an example procedure for enhanced vectorization of raster images in accordance with one or more example embodiments. At block 1502, a raster image including multiple image features and corresponding to a picture having multiple semantic elements is displayed. For example, an image display module 302 can display a raster image 110 corresponding to a picture 204 having multiple semantic elements 206, with the raster image 110 including multiple image features 222. A photographic picture of a woman holding a child in front of a house and a tree line (e.g., as depicted by the raster image 110 of FIG. 4B) may be displayed, for instance, on an LED screen coupled to a computing device.

At block 1504, the raster image is segmented into multiple segments, with each segment of the multiple segments based on at least one image feature of the multiple image features and with the multiple image features serving as a proxy for the multiple semantic elements of the picture. For example, a segmentation module 306 can segment the raster image 110 into multiple segments 212, with each segment 212 of the multiple segments 212 based on at least one image feature 222 of the multiple image features 222 and with the multiple image features 222 serving as a proxy for the multiple semantic elements 206 of the picture 204. To do so, the semantic investigation module 316 may recognize image features 222 including: a sharp foreground with solid colors in the middle of the image, a blurry background portion with green gradients and curved edges, and another blurry background portion with solid colors and straight edges. Further, based on the recognized image features 222 serving as a proxy for human-discernable semantic elements 206, the segmentation module 306 may produce a hierarchical segmentation tree 202 having the following segments 212 at a given level of detail: a house segment, a tree line segment, a woman (adult) segment, and a child segment.

At block 1506, a user interface feature is presented to provide localized control of a vectorization of the picture, with the localized control pertaining to a portion of the raster image. For example, a localized user control module 308 can present a user interface feature, such as at least one tool 128 that accepts user input, to provide localized control of a vectorization of the picture 204, with the localized control pertaining to a portion of the raster image 110. The localized user control module 308 may detect an indication of user input for a spatially-localized, or non-global, user control capability for a vectorization operation 114. The kind of localized control that is provided by the image vectorization module 104 may depend on which localized control mode is currently active with the image vectorization module 104: e.g., a denoising mode, a segment splitting mode, or a segment merging mode.

At block 1508, a user control signal indicative of the portion of the raster image for which a localized vectorization characteristic is to be adjusted is detected. For example, the localized user control module 308 can detect a user control signal 126 indicative of the portion of the raster image 110 for which a localized vectorization characteristic 214 is to be adjusted. The user 106 may, for instance, indicate a spatial portion of the raster image 110 by drawing over the picture 204 using an indicator tool 504. The localized vectorization characteristic 214 may be adjusted for the indicated portion by changing a denoising intensity, by splitting a segment, or by merging two segments in the vicinity of the indicated portion.

At block 1510, a vector image corresponding to at least part of the picture is produced based on the multiple segments and an adjusted localized vectorization characteristic. For example, a vector image production module 310 can produce a vector image 112 corresponding to at least part of the picture 204 based on the multiple segments 212 and an adjusted localized vectorization characteristic 214. To produce the vector image 110, the picture 204, as modified by an adjusted denoising operation—if any, and the hierarchical segmentation tree 202, as adjusted or annotated by a segment splitting or merging procedure—if any, may be used to create vector elements 208 corresponding to semantic elements 206 of the raster image 110. Each vector element 208 may include at least one mathematical formula.

At block 1512, the vector image is displayed. For example, the image display module 302 can display the vector image 112. The image display module 302 may display the vector image 112 with a clean view of the converted picture 204 or with visual indications of different vector elements 208 or different corresponding semantic elements 206. If the image display module 302 is executing remotely from the display screen (e.g., in a cloud computing environment), the image display module 302 can display the vector image 112 by transmitting a command that causes the vector image 112 to be displayed.

FIG. 16 is a flow diagram 1600 including five blocks 1602-1610 and illustrating another example procedure for enhanced vectorization of raster images in accordance with one or more example embodiments. At block 1602, a raster image including multiple image features and corresponding to a picture having multiple semantic elements is displayed. For example, an image display module 302 can display a raster image 110 including multiple image features 222 and corresponding to a picture 204 having multiple semantic elements 206. A photographic picture of a woman holding a child in front of a tree line and a house (e.g., as depicted by the raster image 110 of FIG. 4B) may be displayed, for instance, using a projector coupled to a computing device.

At block 1604, the raster image is analyzed to recognize the multiple image features. For example, a semantic investigation module 316 or a segmentation module 306 can analyze the raster image 110 to recognize the multiple image features 222 and thereby effectively identify the multiple semantic elements 206 from the perspective of the application. To do so, indications of image features 222 may be detected. Such indications may include a same color, a common texture, locations within the same contour edges, a similar texture or pixel pattern, a comparable level of sharpness or blurriness, some combination thereof, and so forth. Individual ones of the multiple trees may be recognized as corresponding to a common or single image feature 222 based on one or more image feature indications, such as a green leafy texture. The common image feature 222 may be included as a segment 212 of a hierarchical segmentation tree 202 as a background tree line semantic element 206. However, a collection of pixels may be identified by the application as belonging to an image feature or corresponding semantic element without necessarily realizing or labeling what object or thing the semantic element actually is.

At block 1606, multiple vector elements representative of at least part of a vector version of the picture are determined. For example, a vector image production module 310 can determine multiple vector elements 208 representative of at least part of a vector version of the picture 204. A mathematical formula for each vector element 208 corresponding to each individual tree may be determined using the hierarchical segmentation tree 202, as well as a user control signal 126—if any.

At block 1608, semantic metadata is generated by associating the multiple vector elements with at least one image feature of the multiple image features, with the multiple image features serving as a proxy for the multiple semantic elements. For example, the semantic investigation module 316 or a semantic information incorporation module 312 can generate semantic metadata 210 by associating the multiple vector elements 208 with at least one image feature 222 of the multiple image features 222, with the multiple image features 222 serving as a proxy for the multiple semantic elements 206. Using the hierarchical segmentation tree 202, the vector elements 208 corresponding to individual trees can each be tagged with the same "tree" indicator to associate the vector elements 208 with a particular image feature 222 that serves as a surrogate for a probable semantic element 206 of a segment 212. Alternatively, each of the vector elements 208 corresponding to individual trees can be grouped into a container that is marked as corresponding to a "tree line" image feature 222. Other association approaches may also be implemented. The tagging or marking may be performed by using an alphanumeric identifier that links one vector element 208 as being similar to, or as belonging to a group that includes, another vector element 208 based on a recognized image feature 222. However, the associating may not actually label the vector element 208 with a specific meaningful name In other words, the vector elements 208 that form the tree line segment may be grouped together based on color and texture, but the tree line segment may be identified as image feature or semantic element "427" or similar and not necessarily defined or labeled as being a "tree line."

At block 1610, a vector image is produced including the multiple vector elements and the associated semantic metadata. For example, the vector image production module 310 or the semantic information incorporation module 312 can individually or jointly produce a vector image 112 including the multiple vector elements 208 and the associated semantic metadata 210. For instance, the multiple vector elements 208 and the associated semantic metadata 210, which links vector elements 208 to semantic elements 206, may be packaged into one file having a known or determinable format that can be parsed to display the picture 204 in vector form while facilitating joint manipulation of multiple vector elements 208.

Having described example procedures in accordance with one or more embodiments, consider now an example system and device that can be utilized to implement the various schemes and techniques described herein.

Example System and Device

Figure 17:
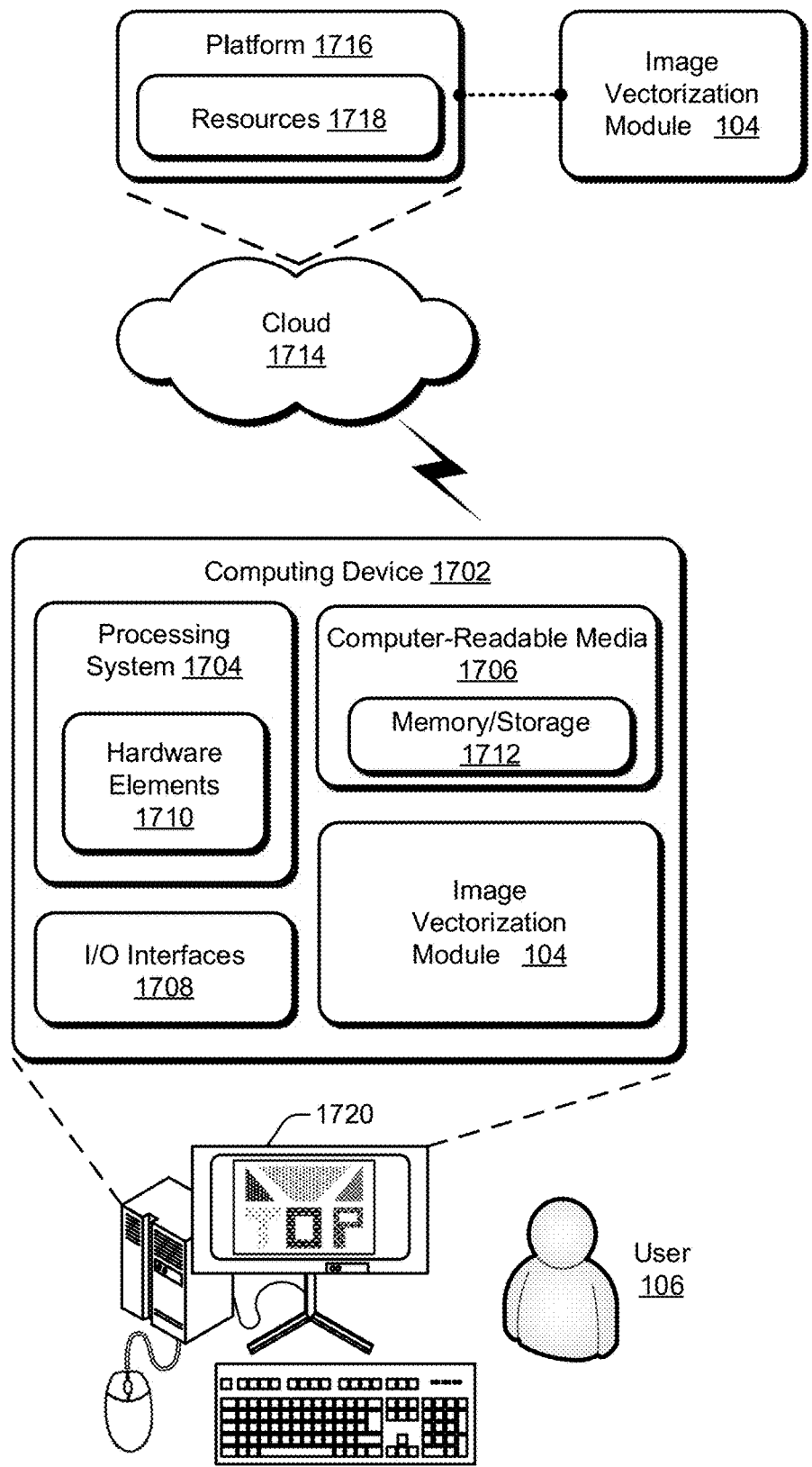
FIG. 17 illustrates an example system or device employable for embodiments of enhanced vectorization of raster images.

FIG. 17 illustrates an example system generally at 1700 including an example computing device 1702 representative of one or more computing systems or computing devices that may implement the various techniques described herein. This is illustrated through the inclusion of an image vectorization module 104, which may operate as described herein above. A computing device 1702 may be implemented as, for example, a computing device 102 (of FIG. 1) in an independent or standalone mode. The computing device 1702 can display one or more images to the user 106 via a display screen 1720. Generally, a computing device 1702 may be implemented as, for example, an end-user device (e.g., a smart phone or desktop computer) of a user 106, a corporate device (e.g., a server side device or data center hardware), an on-chip system or system-on-a-chip (SOC) (e.g., that is integrated with a tablet or image capture device), or any other suitable computing device or computing system.

In an example implementation as shown in FIG. 1, the image vectorization module 104 is executing at one location (e.g., within a housing of the computing device 102). However, the image vectorization module 104 can be executing in the cloud (e.g., on a network-side computing device) if transmission latency is sufficiently small, and such an example implementation as also shown in FIG. 17. Alternatively, a portion of the image vectorization module 104 can be executing at both a client-side computing device and a server-side computing device. In such an implementation, the operations implemented by the image vectorization module 104 as described herein may be distributed across a client-server architecture.

The example computing device 1702 as illustrated includes at least one processing system 1704, one or more computer-readable media 1706, and one or more I/O interfaces 1708 that may be communicatively coupled, one to another. Although not explicitly shown, the computing device 1702 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1704 is representative of functionality to perform one or more operations using hardware. Accordingly, the processing system 1704 is illustrated as including one or more hardware elements 1710 that may be implemented as processors, functional blocks, and so forth. This may include implementation in hardware as an application specific integrated circuit (ASIC), a general-purpose processor, or other logic device formed using e.g. one or more semiconductors. The hardware elements 1710 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 1706 is illustrated as including memory/storage 1712. The memory/storage 1712 represents memory/storage capacity associated with one or more computer-readable media. The memory/storage component 1712 may include volatile media (e.g., random access memory (RAM)) or nonvolatile media (e.g., read only memory (ROM), flash memory, optical discs, or magnetic disks). The memory/storage component 1712 may include fixed media (e.g., RAM, ROM, or a fixed hard drive) or removable media (e.g., a flash memory card, a removable hard drive, or an optical disc). The computer-readable media 1706 may be implemented in a variety of other ways as further described below.

The input/output interface(s) 1708 are representative of functionality to allow a user to enter commands or information to computing device 1702 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., an LCD or LED screen, a monitor, or a projector), a speaker, a printer, a network card, a haptic vibrating device, or a combination thereof. Thus, the computing device 1702 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media 1706 may include a variety of media that may be accessed by the computing device 1702. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, as well as removable and non-removable, media or storage devices implemented in a process or technology suitable for storage of information, such as computer readable instructions, data structures, program modules, logic elements/ circuits, or other data. Examples of computer-readable storage media may include, but are not limited to, RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

"Computer-readable signal media," as used herein, refers to a signal-bearing medium implemented to transmit instructions to hardware of the computing device 1702, such as via a network. Computer-readable signal media typically may embody computer readable instructions, data structures, program modules, or other data in a modulated data signal, such as carrier waves, data signals, or another transport mechanism. Computer-readable signal media may also include any information delivery media. The term "modulated data signal" means a signal having one or more of its characteristics set or changed in such a manner as to encode information in the signal. By way of example, but not limitation, computer-readable signal media may include wired media, such as a wired network or direct-wired connection, or wireless media, such as acoustic, RF, microwave, infrared, or other wireless media.

As previously described, hardware elements 1710 and computer-readable media 1706 may be representative of modules, programmable device logic, fixed device logic, a combination thereof, and so forth that is implemented in a hardware form that may be employed in some embodiments to implement at least some aspects of the techniques described herein, such as to perform one or more instructions or computing actions. Hardware may include components of an integrated circuit (IC) or on-chip system, an application-specific integrated circuit (ASIC), a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 1710. The computing device 1702 may be configured to implement particular instructions or functions corresponding to software or hardware modules. Accordingly, implementation of a module that is executable by the computing device 1702 as software may be achieved at least partially in hardware, e.g., through use of computer-readable storage media or the hardware elements 1710 of the processing system 1704. The instructions or functions may be executable/operable by one or more articles of manufacture (e.g., one or more computing devices 1702 or processing systems 1704) to implement techniques, modules, or examples described herein.

The techniques described herein may be supported by various configurations of the computing device 1702 and are not limited to the specific aspects of the example devices described herein. This functionality may also be implemented fully or partially through use of a distributed system, such as over a "cloud" 1714 via a platform 1716 as described below.

The cloud 1714 may include or represent a platform 1716 for resources 1718. The platform 1716 abstracts underlying functionality of hardware (e.g., one or more servers or at least one data center) and software resources of the cloud 1714. The resources 1718 may include applications or data that can be utilized while computer processing is at least partially executed on servers remote from, or distributed around, the computing device 1702. Resources 1718 may also include services provided over the Internet or through a subscriber network, such as a cellular or Wi-Fi network.

The platform 1716 may abstract resources and functions to connect the computing device 1702 with other computing devices or services. The platform 1716 may also serve to abstract a scaling of resources to provide a corresponding level of scale to encountered demand for the resources 1718 implemented via the platform 1716. Accordingly, in an interconnected device embodiment, implementation of functionality described herein may be distributed throughout the illustrated system of FIG. 17, or at least throughout the cloud 1714 along with the computing device 1702. For example, functionality may be implemented in part on the computing device 1702 as well as via the platform 1716 that abstracts the functionality of the cloud 1714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to enhance conversion of raster images to vector images, a method implemented by a computing device, the method comprising:
  displaying, by an image display module of the computing device, an image corresponding to a picture having multiple semantic elements;
  recognizing, by a semantic investigation module of the computing device, multiple image features from the image based on edges detected in the image, the multiple image features serving as a proxy for the multiple semantic elements of the picture;
  producing, by an image analysis module of the computing device, multiple segments for the image based on the multiple image features over different levels of detail of the image;
  detecting, by a localized user control module of the computing device, a user control signal indicative of at least one segment of one of the different levels of detail for which a localized vectorization characteristic is to be adjusted;

adjusting, by the image analysis module of the computing device, the at least one segment according to the localized vectorization characteristic; and generating, by a vector image production module of the computing device, a vector image based on the at least one segment adjusted according to the localized vectorization characteristic.

2. The method as described in claim 1, further comprising generating, by an edge detection module of the computing device, a contour map of the edges detected in the image.

3. The method as described in claim 2, further comprising determining multiple edge probability maps based on respective steerable filters, wherein the contour map is generated based on the multiple edge probability maps.

4. The method as described in claim 2, further comprising displaying the contour map.

5. The method as described in claim 2, further comprising:
producing, by the image analysis module, a hierarchical segmentation tree based on the contour map and the multiple image features, the multiple segments of the image distributed over the hierarchical segmentation tree, the hierarchical segmentation tree organized according to the different levels of detail of the image.

6. The method as described in claim 3, wherein the adjusting the at least one segment includes updating the hierarchical segmentation tree according to the localized vectorization characteristic to form an updated hierarchical segmentation tree, and the vector image is based on the updated hierarchical segmentation tree.

7. The method as described in claim 1, further comprising overlaying, by the image display module, segments of the one of the different levels of detail on the image displayed.

8. The method as described in claim 7, wherein a number of the segments overlaying the image is determined based on a user-indicated setting.

9. The method as described in claim 1, wherein the user control signal further indicates at least one edge to be excluded from vectorization.

10. The method as described in claim 1, further comprising:
generating semantic metadata for each vector element of the vector image by associating said each vector element with at least one image feature of the multiple image features based on the at least one segment adjusted according to the localized vectorization characteristic; and packaging the semantic metadata and said each vector element into one file that can be parsed to display the picture in vector form while facilitating joint manipulation of multiple vector elements of the vector image.

11. The method as described in claim 1, wherein the one of the different levels of detail is a default level of detail.

12. The method as described in claim 1, wherein the one of the different levels of detail is user selectable via a user interface control feature.

13. At least one computing device operative in a digital medium environment to enhance conversion of raster images to vector images, the computing device comprising:
an image display module configured to display an image corresponding to a picture having multiple semantic elements;
a semantic investigation module configured to recognize multiple image features from the image based on edges detected in the image, the multiple image features serving as a proxy for the multiple semantic elements of the picture;
an image analysis module configured to produce multiple segments for the image based on the multiple image features over different levels of detail of the image;
a localized user control module configured to detect a user control signal indicative of at least one segment of one of the different levels of detail for which a localized vectorization characteristic is to be adjusted;
the image analysis module configured to adjust the at least one segment according to the localized vectorization characteristic; and
a vector image production module configured to generate a vector image based on the at least one segment adjusted according to the localized vectorization characteristic.

14. The computing device as described in claim 13, wherein the image display module is further configured to display the vector image.

15. The computing device as described in claim 13, wherein each vector element of the vector image includes at least one mathematical formula.

16. The computing device as described in claim 13, further comprising:
an edge detection module configured to generate a contour map of the edges detected in the image;
the image analysis module further configured to:
produce a hierarchical segmentation tree based on the contour map and the multiple image features, the multiple segments of the image distributed over the hierarchical segmentation tree, the hierarchical segmentation tree organized according to the different levels of detail of the image; and
update the hierarchical segmentation tree according to the localized vectorization characteristic to form an updated hierarchical segmentation tree; and
the vector image production module further configured to generate the vector image based on the updated hierarchical segmentation tree.

17. In a digital medium environment to enhance conversion of raster images to vector images, a system comprising:
one or more processors; and
a memory having instructions that are executable by the one or more processors to implement an image vectorization module that is configured to:
display an image corresponding to a picture having multiple semantic elements;
recognize multiple image features from the image based on edges detected in the image, the multiple image features serving as a proxy for the multiple semantic elements of the picture;
produce multiple segments for the image based on the multiple image features over different levels of detail of the image;
detect a user control signal indicative of at least one segment of one of the different levels of detail for which a localized vectorization characteristic is to be adjusted;
adjust the at least one segment according to the localized vectorization characteristic; and
generate a vector image based on the at least one segment adjusted according to the localized vectorization characteristic.

18. The system as described in claim 17, wherein the image vectorization module is further configured to:
generate a contour map of the edges detected in the image;

produce a hierarchical segmentation tree based on the contour map and the multiple image features, the multiple segments of the image distributed over the hierarchical segmentation tree, the hierarchical segmentation tree organized according to the different levels of detail of the image;

update the hierarchical segmentation tree according to the localized vectorization characteristic to form an updated hierarchical segmentation tree; and generate the vector image based on the updated hierarchical segmentation tree.

19. The system as described in claim 18, wherein the image vectorization module is further configured to overlay segments of the one of the different levels of detail on the image displayed, and the one of the different levels of detail is a user-selected level of detail.

20. The system as described in claim 18, wherein the image vectorization module is further configured to:

generate semantic metadata for each vector element of the vector image by associating said each vector element with at least one image feature of the multiple image features based on the at least one segment adjusted according to the localized vectorization characteristic; and package the semantic metadata and said each vector element into one file that can be parsed to display the picture in vector form while facilitating joint manipulation of multiple vector elements of the vector image.

\* \* \* \* \*